United States Patent
Ohashi et al.

(10) Patent No.: US 10,211,438 B2
(45) Date of Patent: Feb. 19, 2019

(54) ELECTRONIC COMPONENT PROTECTING COVER

(71) Applicant: Yazaki Corporation, Tokyo (JP)

(72) Inventors: Norihiro Ohashi, Makinohara (JP); Masayoshi Ozawa, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 535 days.

(21) Appl. No.: 14/753,615

(22) Filed: Jun. 29, 2015

(65) Prior Publication Data

US 2016/0006003 A1 Jan. 7, 2016

(30) Foreign Application Priority Data

Jul. 1, 2014 (JP) .................................. 2014-136360
Jul. 1, 2014 (JP) .................................. 2014-136361

(51) Int. Cl.
| | | |
|---|---|---|
| H01M 2/04 | (2006.01) | |
| H01M 2/10 | (2006.01) | |
| B65D 43/24 | (2006.01) | |
| H01M 2/34 | (2006.01) | |

(52) U.S. Cl.
CPC .......... *H01M 2/1094* (2013.01); *B65D 43/24* (2013.01); *H01M 2/1072* (2013.01); *B65D 2251/1008* (2013.01); *H01M 2/34* (2013.01); *H01M 2200/103* (2013.01); *H01M 2220/20* (2013.01)

(58) Field of Classification Search
CPC ............. H01M 2/1094; H01M 2/1072; H01M 2200/103; H01M 2/34; B65D 43/24; B65D 51/18; B65D 51/04; B65D 2251/1008

USPC ............................................. 217/60; 220/831
See application file for complete search history.

(56) References Cited

U.S. PATENT DOCUMENTS

| | | | | |
|---|---|---|---|---|
| 6,422,887 | B1 * | 7/2002 | Myer | ................ H01R 13/6273 439/268 |
| 6,426,465 | B1 | 7/2002 | Kosuge | |
| 2002/0168566 | A1 * | 11/2002 | Ohtsuka | ............... H01M 2/043 429/175 |
| 2008/0083768 | A1 * | 4/2008 | Luburic | ............... B65D 43/161 220/810 |

(Continued)

FOREIGN PATENT DOCUMENTS

| | | |
|---|---|---|
| JP | 2000-340213 A | 12/2000 |
| JP | 2002-329492 A | 11/2002 |

OTHER PUBLICATIONS

Office Action dated Mar. 20, 2018 by the Japanese patent Office in counterpart Japanese Patent Application No. 2014-136361.

*Primary Examiner* — Michael L Dignan
(74) *Attorney, Agent, or Firm* — Sughrue Mion, PLLC

(57) ABSTRACT

An electronic component protecting cover includes a fixed cover portion, a hinge portion, and a rotatable cover portion. One of the fixed cover portion and the rotatable cover portion has engaging portions at two locations, and the other of the fixed cover portion and the rotatable cover portion has catching portions at two locations, the engaging portions and the catching portions being configured to be engaged with each other. Each of the engaging portions has a pair of locking tabs, and each of the catching portions has a pair of locking frames. Because each of the engaging portions and each of the catching portions has double-locking structure, sufficient locking force can be provided.

15 Claims, 17 Drawing Sheets

(56) References Cited

U.S. PATENT DOCUMENTS

2008/0245792 A1\* 10/2008 Chou ................ B65D 47/0847
                                                    220/254.3
2011/0062705 A1\* 3/2011 Wong ................ F16L 25/0072
                                                      285/320

\* cited by examiner

ELECTRONIC COMPONENT PROTECTING COVER

CROSS-REFERENCE TO RELATED APPLICATIONS

The present application claims priority from Japanese Patent Application Nos. 2014-136360 and 2014-136361 both filed on Jul. 1, 2014, the entire contents of which are incorporated herein by reference.

FIELD OF INVENTION

The present invention relates to an electronic component protecting cover for protecting a battery terminal and a fuse unit connected to the battery post of a vehicle battery to prevent short circuit due to contact with external objects and to prevent corrosion due to the intrusion of water drops or the like.

RELATED ART

A battery terminal, a fuse unit, etc. for supplying electric power to, for example, auxiliary devices are connected to the plus side battery post of a vehicle battery. Such a battery terminal and a fuse unit are usually protected with a protecting cover made of resin to prevent short circuit due to contact with external objects and to prevent corrosion due to the intrusion of water drops or the like.

FIGS. 19A to 22B illustrate a conventional battery connection protecting cover disclosed in JP2002-329492A.

As shown in FIGS. 19A and 19B, this protecting cover 201 is entirely configured as an integrated resin-molded product and has a fixed cover portion 210 mounted and fixed to the side of a battery to cover a battery terminal and a fuse unit directly mounted on a battery post and a rotatable cover portion 230 connected to the fixed cover portion 210 via a hinge portion 220 and capable of being opened and closed around the axis of the hinge portion 220 as a rotation center.

Insertion tabs 251 having locking protrusions 253 at the tip end sides thereof are provided close to the hinge portion 220 on the upper wall of the rotatable cover portion 230, and insertion hole sections 240 into which the insertion tabs 251 are inserted when the rotatable cover portion 230 is opened are provided on the upper wall of the fixed cover portion 210 as shown in FIGS. 20 and 21. The insertion tabs 251 are provided as a pair at positions close to respective ends of the hinge portion 220 in the axial direction, and the insertion hole sections 240 are provided as a pair at positions corresponding to the positions of the insertion tabs 251.

Each of the insertion tabs 251 is configured as a rib-like protruding wall along the rotation face of the rotatable cover portion 230, and the respective locking protrusion 253 of the pair of insertion tabs 251 are formed on the outside or inside faces of the insertion tabs 251 so as to protrude outward or inward to each other. In the example shown in the figures, the locking protrusion 253 are formed on the inside faces of the insertion tabs 251 so as to protrude inward to each other.

The insertion hole section 240 is formed as a through hole, and at the inlet section thereof, an inclined face 243 for smoothly guiding the insertion of the locking protrusion 253 is formed as shown in FIGS. 21, 22A and 22B. Furthermore, the protrusion amount (protrusion height) of the locking protrusion 253 is set so as to correspond to the engagement amount of the locking protrusion 253 with respect to the insertion hole section 240. Moreover, the locking protrusion 253 is formed into a hemispherical shape.

When opening the rotatable cover portion 230, the rotatable cover portion 230 is lifted approximately 90° upward by using the axial line of the hinge portion 220 as the rotation center thereof as shown in FIG. 20. When the rotatable cover portion 230 is moved to its open position as described above, the insertion tabs 251 of the rotatable cover portion 230 are gradually inserted into the insertion hole sections 240 of the fixed cover portion 210.

When the insertion tabs 251 are inserted into the insertion hole sections 240, the locking protrusions 253 first make slide contact with the inner peripheral edge sections of the insertion hole sections 240 and enter the innermost portions of the insertion hole sections 240 while the insertion tabs 251 deflect outward as shown in FIG. 22A. When the locking protrusions 253 pass through the inner peripheral edge sections of the insertion hole sections 240 as the insertion tabs 251 advances to the innermost portions, the insertion tabs 251 elastically return inward at the positions as shown in FIG. 22B. As a result, the locking protrusions 253 are engaged with the inner peripheral edge sections of the insertion hole sections 240, and the rotatable cover portion 230 is held in its opened state.

Furthermore, when the rotatable cover portion 230 is engaged in the opened state as described above, since the insertion tabs 251 and the insertion hole sections 240 are respectively provided as a pair, the rotatable cover portion 230 is held so as to be supported at two points.

Moreover, since the respective locking protrusions 253 of the pair of insertion tabs 251 are formed so as to protrude outward or inward, when the locking protrusions 253 are inserted into the insertion hole sections 240 while making contact with the inner peripheral edge sections of the insertion hole sections 240, the directions of the lateral forces exerted to the inner peripheral edge sections of the respective insertion hole sections 240 become opposite to each other.

However, in the related art example described above, the insertion tabs 251 and the insertion hole sections 240 are respectively provided as a pair at only the two positions close to both the end sides of the hinge portion 220. Hence, the protrusion height of the locking protrusions 253 is required to be set large to raise the engagement strength at the open position of the rotatable cover portion 230. However, in the case that the protrusion height of the locking protrusions 253 is set large, the lapping amount (engagement amount) at the time of the engagement increases, whereby the load at the time of opening or closing the rotatable cover portion 230 tends to concentrate at the tip ends of the locking protrusions 253. As a result, the locking protrusions 253 may worn down due to the repeated opening and closing operations of the rotatable cover portion, whereby the holding forces of the locking protrusions decrease and may be unable to exhibit a sufficient engagement function.

By setting the protrusion height of the respective locking protrusions small and increasing the number of the insertion tabs, the abrasion of the locking protrusions due to the opening and closing operations may be minimized to maintain the holding forces. However, in the case that the insertion tabs are disposed so as to be separated and distant from each other, the molding errors in the insertion tabs themselves and among the locking tabs due to the influence of resin flow during resin molding become large. Consequently, the performance of the engagement tends to be adversely affected as the number of the insertion tabs is increased. For this reason, it is difficult to reduce the deterioration of the holding forces by simply increasing the number of the insertion tabs.

Moreover, in the related art example described above, since the locking protrusions 253 provided on the tip end sides of the insertion tabs 251 are formed into a hemispherical shape, the insertion force (the operation force for the engagement) at the time when the insertion tabs 251 are engaged with the insertion hole sections 240 is nearly equal to the engagement holding force (the holding force at the time when the force in the direction of releasing the engagement is exerted) after the engagement of the insertion tabs 251 with the insertion hole sections 240. This causes a problem in which in the case that the protrusion height of the locking protrusions 253 is increased to raise the holding force, the insertion force is also increased, whereby the workability at the time of the insertion is degraded; on the other hand, in the case that the protrusion height of the locking protrusions is decreased to raise the workability, the holding force is lowered. Furthermore, another problem is caused in which since the locking protrusions 253 have a hemispherical shape, the load concentrates at the vertex sections thereof at the time of the engagement operation, the vertex sections are worn down by the sliding action due to the repeated opening and closing operations, and the holding force is eventually lowered, and the locking protrusions cannot exert a sufficient engagement holding force.

SUMMARY

Illustrative aspects of the present invention provide an electronic component protecting cover capable of reducing the lowering of the engagement holding force caused by the repeated opening and closing operations of the rotatable cover portion thereof.

Illustrative aspects of the present invention provide an electronic component protecting cover capable of improving workability during engagement operation by reducing the operation force that is exerted when the engaging portions thereof are engaged with the catching portions thereof.

According to an illustrative aspect of the present invention, an electronic component protecting cover includes a fixed cover portion configured to be mounted on an electronic component in a fixed manner, a hinge portion, and a rotatable cover portion connected to the fixed cover portion via the hinge portion such that the rotatable cover portion is operable to be opened and closed around an axis of the hinge portion as a rotation center. One of the fixed cover portion and the rotatable cover portion has engaging portions at two locations along an axial direction of the hinge portion, and the other of the fixed cover portion and the rotatable cover portion has catching portions at two locations along the axial direction of the hinge portion, the engaging portions and the catching portions being configured such that, when the rotatable cover portion is moved to an open position, the engaging portions and the catching portions are engaged with each other to hold the rotatable cover portion at the open position. Each of the engaging portions has a pair of rib-shaped locking tabs disposed so as to be separated from each other in the axial direction of the hinge portion and parallel to each other, the locking tabs are configured to deflect in the axial direction of the hinge portion during the engagement of the engaging portions and the catching portions, and the locking tabs has locking protrusions protruding outwardly from outside faces of the locking tabs or inwardly from inside faces of the locking tabs bilaterally symmetrically with respect to a center line between the locking tabs. Each of the catching portions has a pair of locking frames disposed so as to be separated from each other in the axial direction of the hinge portion and parallel to each other, the locking frames are configured to be engaged with the locking protrusions of the pair of locking tabs through the deflection of the locking tabs, and the locking frames has locking edges configured to be engaged with the locking protrusions, the locking edges being provided inwardly or outwardly on sides on which the locking protrusions of the corresponding locking tabs are provided. A distance between the pair of locking tabs is smaller than a distance between one of the locking tabs of one of the engaging portions and located on a side of the other of the engaging portions and one of the locking tabs of the other of the engaging portions located on a side of the one of the engaging portions.

According to another illustrative aspect of the present invention, an electronic component protecting cover includes a fixed cover portion configured to be mounted on an electronic component in a fixed manner, a hinge portion, and a rotatable cover portion connected to the fixed cover portion via the hinge portion such that the rotatable cover portion is operable to be opened and closed around an axis of the hinge portion as a rotation center. One of the fixed cover portion and the rotatable cover portion has an engaging portion, and the other of the fixed cover portion and the rotatable cover portion has a catching portion, the engaging portion and the catching portion being configured such that, when the rotatable cover portion is moved to an open position, the engaging portion and the catching portion are engaged with each other to hold the rotatable cover portion at the open position. The engaging portion has a locking tab formed so as to be perpendicular to an axial direction of the hinge portion, the locking tab is configured to deflect in the axial direction of the hinge portion during the engagement between the engaging portion and the catching portion, and the locking tab has a locking protrusion protruding outwardly from an outside face of the locking tab or inwardly from an inside face of the locking tab. The catching portion has a locking frame configured to be engaged with the locking protrusion of the locking tab through the deflection of the locking tab, and the locking frame has a locking edge configured to be engaged with the locking protrusion, the locking edge being provided inwardly or outwardly on a side on which the locking protrusion of the locking tab is provided. The locking protrusion has a front side face configured as an upward sloping face that makes slide contact with the locking edge to gradually deflect the locking tab when the rotatable cover portion is first moved toward the open position, a rear side face configured as a downward sloping face that makes slide contact with the locking edge after locking tab slides over the upward sloping face through the deflection of the locking tab and allows the locking tab to gradually return from the deflected state to generate an engagement force between the locking tab and the locking edge, the downward sloping face being steeper than the upward sloping face, and a intermediate section extending from the upward sloping face to the downward sloping face and having a curved or flat surface, the intermediate section located inside an outer peripheral face of the locking protrusion if the locking protrusion is formed to have a hemispherical shape. The downward sloping face may coincide with a portion of the outer peripheral face of the locking protrusion if the locking protrusion is formed to have hemispherical shape. The diameter of the hemispherical shape may correspond to a distance between a lower end of the upward sloping face and a lower end of the downward sloping face.

BRIEF DESCRIPTION OF THE DRAWINGS

FIG. 22A is a view showing the state during the engagement, and FIG. 22B is a view showing the state of the engagement.

DETAILED DESCRIPTION

Figure 1:
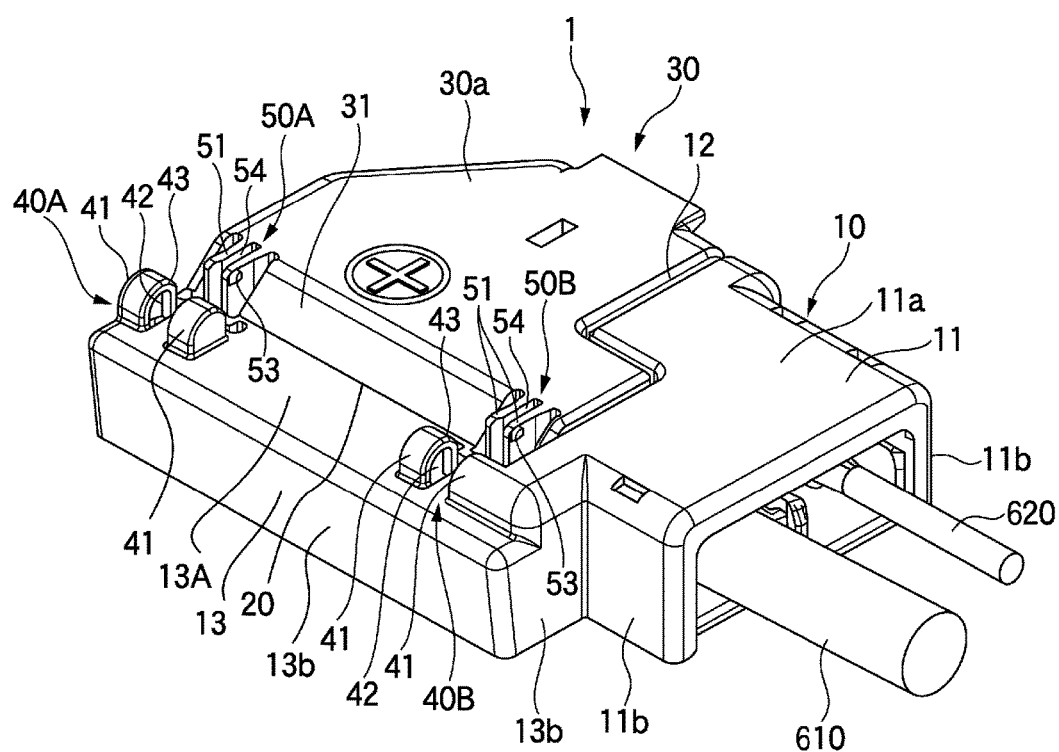
FIG. 1 is a perspective view of a protecting cover according to a first exemplary embodiment of the present invention, illustrating a state in which a rotatable cover portion of the protecting cover is closed.

Exemplary embodiments according to the present invention will be described below referring to the drawings.

Figure 2:
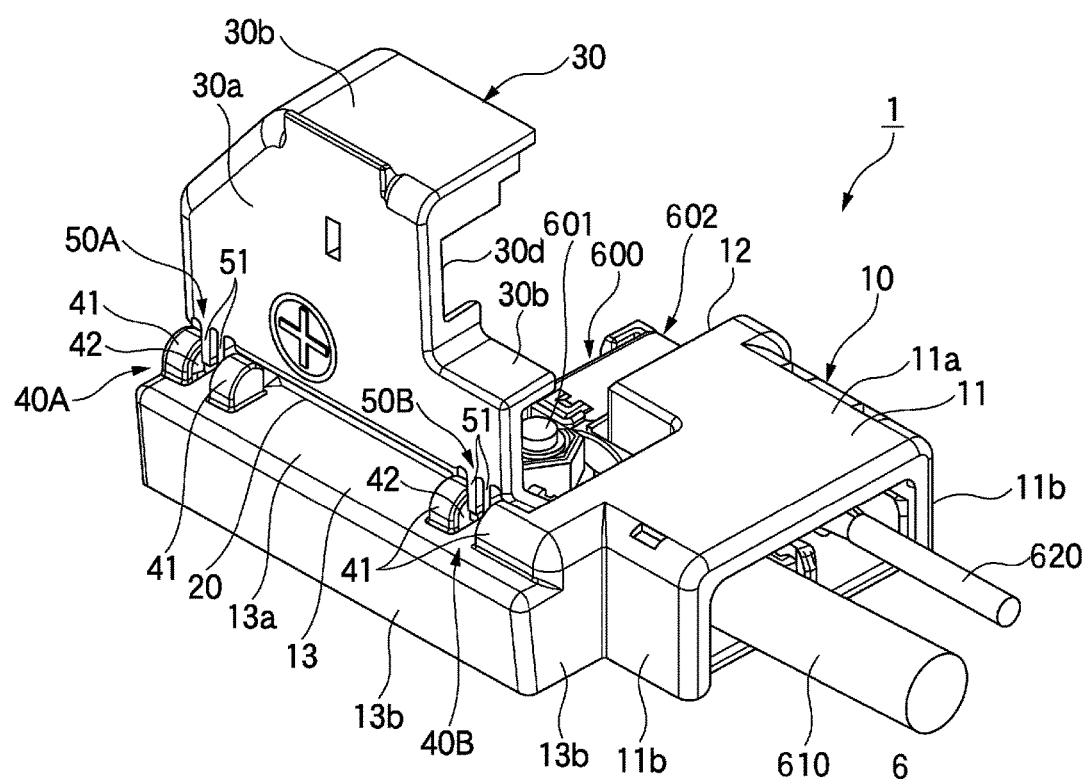
FIG. 2 is another perspective view of the protecting cover, illustrating a state in which the rotatable cover portion is opened.
Figure 3:
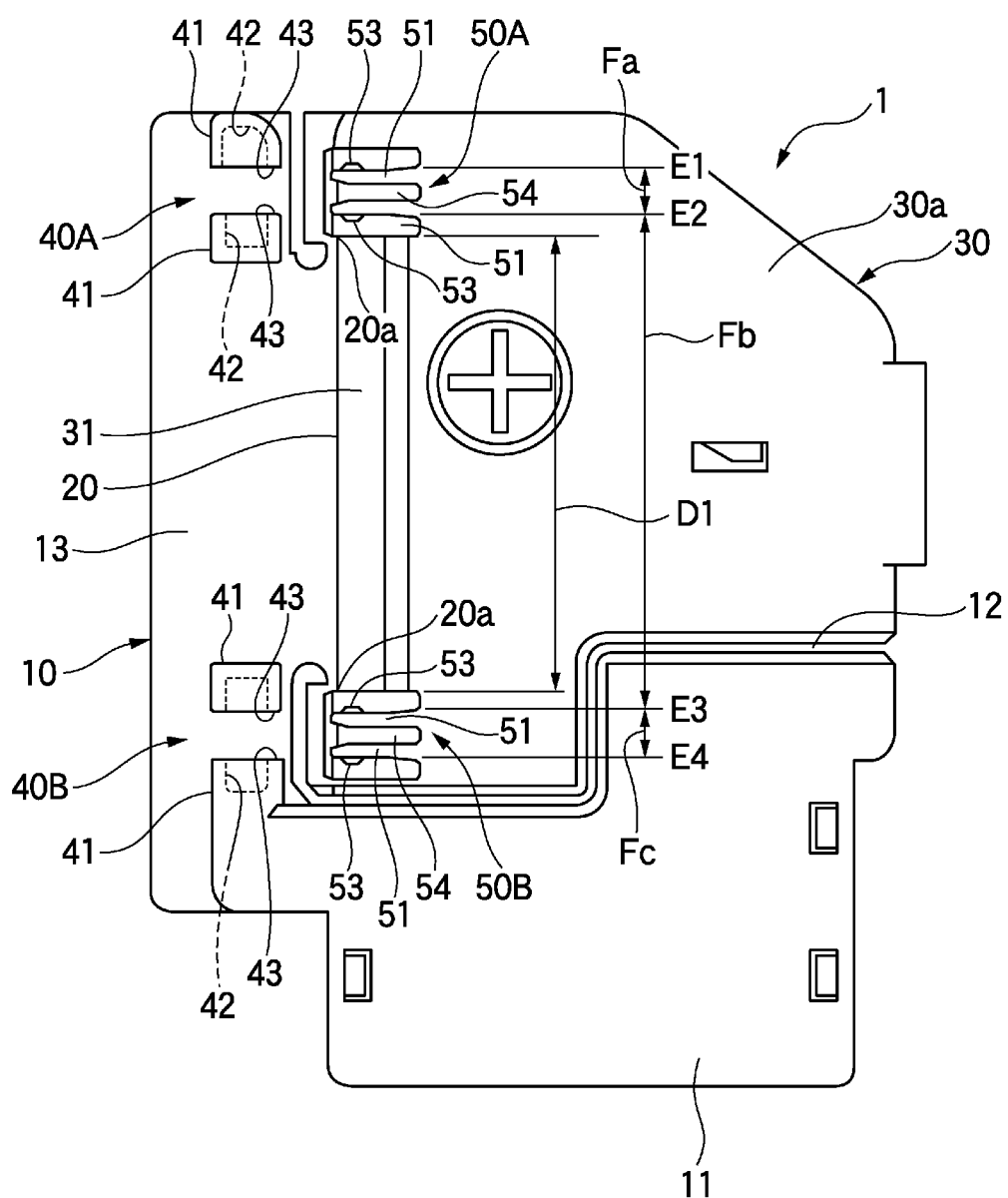
FIG. 3 is a plan view of the protecting cover with the rotatable cover portion being closed.
Figure 4:
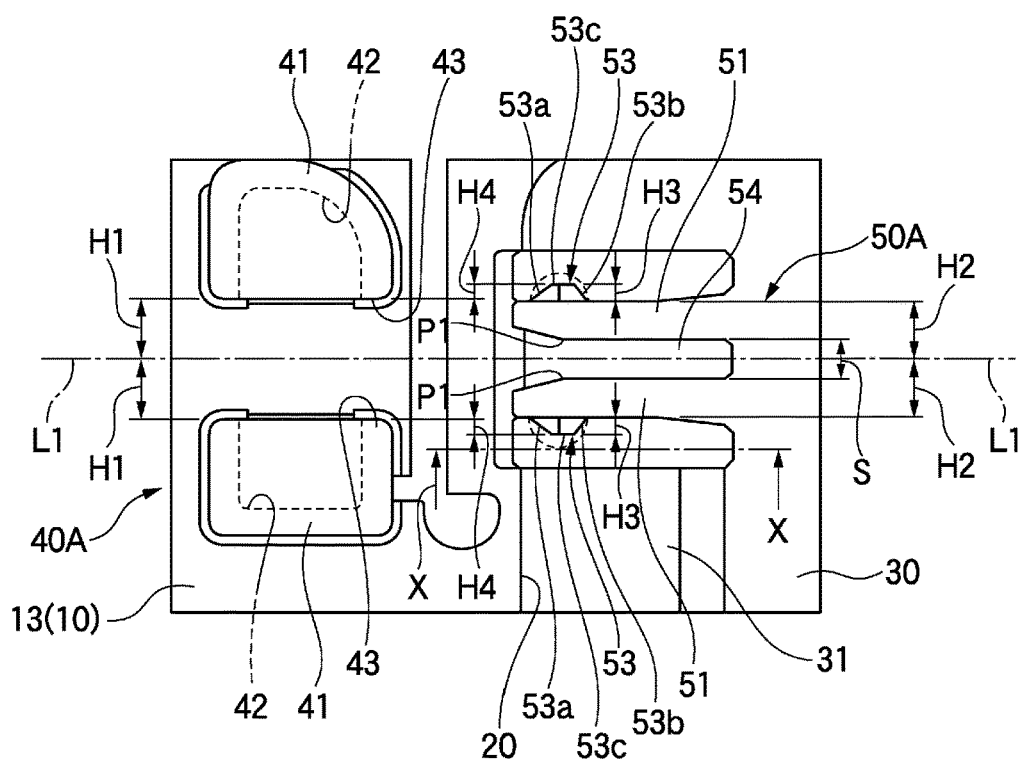
FIG. 4 is an enlarged view of a portion of FIG. 3, illustrating relevant parts of the protecting cover.

FIG. 1 is a perspective view showing a protecting cover according to a first exemplary embodiment with the rotatable cover portion thereof closed; FIG. 2 is a perspective view showing the protecting cover with the rotatable cover portion thereof opened; FIG. 3 is a plan view showing the protecting cover with the rotatable cover portion thereof closed; FIG. 4 is an enlarged view showing the relevant parts of the protecting cover shown in FIG. 3; and FIG. 4 is a cross-sectional view taken along the line X-X in FIG. 4.

As shown in FIGS. 1 to 3, this protecting cover 1 is a protecting cover for a battery connection section 600 and is entirely configured as an integrated resin-molded product. The protecting cover 1 has a fixed cover portion 10 mounted and fixed to the side of a battery to cover a battery terminal 601 and a fuse unit 602 directly mounted on a battery post and a rotatable cover portion 30 connected to the fixed cover portion 10 via a hinge portion 20 and capable of being opened and closed around the axis of the hinge portion 20 as the rotation center. Although a battery is taken as an example of an electronic component in this exemplary embodiment, the electronic component is not limited to the battery in the present invention. The present invention is also applicable to a protecting cover for electronic components, such as electric connection boxes and connectors.

The fixed cover portion 10 has a wire drawing portion 11 from which electric wires 610, 620 are extracted; a cut-out section 12 having a rectangular shape in a top view; and a rotation support portion 13 for supporting, via the hinge portion 20, the rotatable cover portion 30 fitted in the cut-out section 12. The battery connection section 600 including such as the battery terminal 601 and the fuse unit 602 is disposed in the cut-out section 12. When the rotatable cover portion 30 is opened, work necessary for the battery connection section 600 can be carried out.

The wire drawing portion 11 and the rotation support portion 13 of the fixed cover portion 10 respectively have upper walls 11a and 13a and side walls 11b and 13b so as to be able to cover portions to be protected, and the upper wall 11a of the wire drawing portion 11 is raised one step higher than the upper wall 13a of the rotation support portion 13. In addition, the rotatable cover portion 30 has an upper wall 30a and side walls 30b so as to be able to cover the portions to be protected in a similar way when the rotatable cover portion is closed. The upper wall 30a of the rotatable cover portion 30 is set flush with the upper wall 11a of the wire drawing portion 11 when the rotatable cover portion closed. Furthermore, a cutout 30d (see FIG. 2) is provided in the required position of the side wall 30b to avoid interference with the battery connection section 600 and other objects when the rotatable cover portion 30 is closed.

The hinge portion 20 is formed linearly at the boundary section of the upper wall 13a of the rotation support portion 13 of the fixed cover portion 10 and the upper wall 30a of the rotatable cover portion 30. In this configuration, since the hinge portion 20 is provided at the height of the upper wall 13a of the rotation support portion 13 of the fixed cover portion 10, an inclined face 31 being inclined downward toward the hinge portion 20 is provided on the side edge section of the upper wall 30a of the rotatable cover portion 30 on the side of the rotation support portion 13, the upper wall 30a being located at a position raised one step higher than the upper wall 13a of the rotation support portion 13. The hinge portion 20 is made thinner than the upper wall 30a of the rotatable cover portion 30 and the upper wall 13a of the rotation support portion 13 of the fixed cover portion 10, thereby being made flexible.

On the upper wall 13a of the rotation support portion 13 and the upper wall 30a of the rotatable cover portion 30 in the vicinity of both the end sections of the hinge portion 20 in the axial direction, engaging portions 50A, 50B and catching portions 40A, 40B that are engaged with each other to hold the rotatable cover portion 30 at its open position when the rotatable cover portion 30 is moved to the open position as shown in FIG. 2 are respectively provided in the axial direction of the hinge portion 20.

Each of the engaging portions 50A, 50B has a pair of rib-shaped locking tabs 51 having a triangular shape in a side view. The locking tabs 51 used as a pair are respectively formed as protruding walls along the rotation face (the face perpendicular to the axial line of the hinge portion 20) of the rotatable cover portion 30 and disposed so as to be separated from each other in a direction perpendicular to the rotation face (in the axial direction of the hinge portion 20) and parallel to each other. Furthermore, the tip end sides of the locking tabs are formed so as to be deflectable in the direction perpendicular to the rotation face during the engagement. The pair of locking tabs 51 having a triangular shape in a side view is disposed on the inclined face 31 of the rotatable cover portion 30. The protrusion dimension of the locking tab 51 is set so that the upper end edge of the locking tab 51 is as high as the upper face of the rotatable cover portion 30.

As shown in FIG. 4, on the outside faces of the tip end sections of the pair of locking tabs 51, the tip end sections being deflectable in the direction perpendicular to the rotation face, locking protrusions 53 are provided so as to protrude outward bilaterally symmetrically with respect to the center line L1 (hereafter referred to as the "center line L1" of each of the engaging portions 50A, 50B and the catching portions 40A, 40B) between both the locking tabs 51. A deflection space (clearance) 54 for allowing both the locking tabs 51 to deflect by a required amount is secured between the inside faces of the pair of locking tabs 51. Since a taper is formed on the inside faces of the pair of locking tabs 51 so that the locking tabs become slender toward the tip ends thereof, the movable ranges of both the locking tabs 51 are widened.

On the other hand, the catching portions 40A, 40B disposed so as to respectively correspond to the engaging portions 50A, 50B are each composed of a pair of locking frames 41 disposed so as to be separated from each other in the direction perpendicular to the rotation face (in the axial direction of the hinge portion 20). The pair of locking frames 41 has locking edges 43 with which the locking protrusions 53 of the locking tabs 51 are engaged by using the deflection of the locking tabs 51, and these locking edges 43 are opposed inward to each other on the sides on which the locking protrusions 53 are provided.

In the case of this configuration, the pair of locking frames 41 has a bottomed cylindrical shape in which recesses 42 are disposed so as to be opposed to each other in the direction perpendicular to the rotation face, and the locking edges 43 are formed as the edges of the peripheral walls of the recesses 42. In FIG. 4, the distance from the center line L1 to each of the pair of locking edges 43 opposed inward to each other is denoted by H1, the distance from the center line L1 to the outside face of the locking tab 51 is denoted by H2, the protrusion height of the locking protrusion 53 is denoted by H3, and the engagement amount (lapping amount) of the locking protrusion 53 with respect to the locking edge 43 is denoted by H4. Here, H1=H2 and H3=H4.

At two points P1 on the pair of locking tabs 51 where the pair of locking tabs 51 becomes closest to each other during the deflection, the sum (H3+H3) of the protrusion heights H3 of the locking protrusions 53 is smaller than the distance (S) between the pair of locking tabs 51 in a state in which the pair of locking tabs 51 are not deflected. With this configuration, the pair of locking tabs 51 does not make contact with each other at the time of the deflection, whereby the locking tabs 51 can deflect properly. In particular, by setting the distance S between the pair of non-deflected locking tabs 51 to be slightly larger than the sum (H3+H3) of the protrusion heights (H3+H3) of the locking protrusions 53 of the respective locking tabs 51, the distance between the pair of locking tabs 51 can be minimized at the two points P1. Hence, in the pair of locking tabs 51 located at the above-mentioned positions, the molding error between the locking tabs 51 due to the influence of resin flow during resin molding is very small, whereby adverse influence on the performance of the engagement can be minimized.

In addition, as shown in FIGS. 1 to 3, the engaging portions 50A, 50B and the catching portions 40A, 40B are disposed on outer sides of respective ends of the hinge portion in the axial direction. Furthermore, as shown in FIG. 3, the distances Fa and Fc between the respective pairs of outside and inside locking tabs 51 are set considerably smaller than the distance Fb between the two locking tabs 51 located inside the outside and inside pairs of locking tabs 51 constituting the respective engaging portions 50A, 50B.

This point will be described below in detail. In FIG. 3, the positions of the substantial engagement points of the four locking tabs 51 arranged from one side to the other side in the axial direction of the hinge portion 20 are denoted by E1, E2, E3 and E4. The distances between the pairs of two outside and inside locking tabs 51 are the distance Fa between E1 and E2 and the distance Fc between E3 and E4. The distance between the two locking tabs 51 located inside the respective pairs of locking tabs 51 is the distance Fb between E2 and E3. Since the length D1 of the hinge portion 20 in the axial direction is set as long as possible to attain bending stability, the distance Fb between the locking tabs 51 located at the positions E2 and E3 outside the hinge portion is eventually set considerably long. On the other hand, the distances Fa and Fc between the respective pairs of locking tabs 51 are desired to be set to the minimum depending on the thickness and the required deflection amount of the locking tabs 51, whereby the distances are set as small as possible in comparison with the distance Fb.

Figure 5:
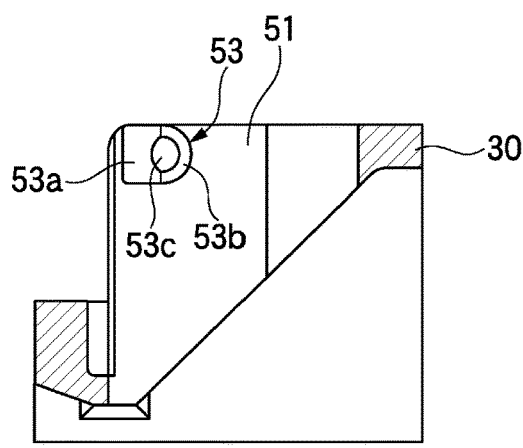
FIG. 5 is a cross-sectional view taken along the line X-X in FIG. 4.

Moreover, the locking protrusion 53 formed on the outside face of the locking tab 51 is configured as described below in detail. Referring to FIGS. 4 and 5, the front side face of (the left side face in the drawings) of the locking protrusion 53 is configured as a gentle upward sloping face 53a that makes slide contact with the locking edge 43 to gradually deflect the locking tab 51 when the rotatable cover portion 30 is first moved toward the open position. The rear side face thereof is configured as a steep downward sloping face 53b that makes slide contact with the locking edge 43 after the locking tab 51 slides over the gentle upward sloping face 53a through the deflection of the locking tab 51 and allows the locking tab 51 to gradually return from the deflected state to generate an engagement force between the locking tab 51 and the locking edge 43. The steep downward sloping face 53b has an inclination angle steeper than that of the sloping face 53a. The intermediate section extending from the gentle upward sloping face 53a to the steep downward sloping face 53b is formed as a flat cut face 53c that is parallel to the rotation plane of the hinge portion 20. Hence, the intermediate section is formed as a cut face having a vertex located on the side of the locking tab 51 away from the flat plane including the gentle upward sloping face 53a.

The cut face 53c extending from the gentle upward sloping face 53a to the steep downward sloping face 53b is located inside the outer peripheral face (the outer peripheral face is indicated by a broken line in FIG. 4) of the locking protrusion if the locking protrusion is formed to have a hemispherical shape. In particular, as shown in FIG. 4, the cut face 53c is located inside the outer peripheral face of the locking protrusion if the locking protrusion is formed to have a hemispherical shape having a diameter equal to the distance between the lower end of the gentle upward sloping face 53a and the lower end of the steep downward sloping face 53b. However, the shape of the locking protrusion being assumed to be formed into a hemispherical shape is not limited to such a hemispherical shape having the diameter equal to the distance between the lower end of the gentle upward sloping face 53a and the lower end of the steep downward sloping face 53b. It may be possible to assume that the shape of the locking protrusion is formed into a hemispherical shape having a diameter smaller than that equal to the distance between the lower end of the gentle upward sloping face 53a and the lower end of the steep downward sloping face 53b. Furthermore, although the surface shape of the intermediate section has been described as the cut face 53c, the shape of the intermediate section is not limited to such a flat plane shape but may be a curved shape. In other words, the shape may be a shape other than a conical shape rising toward one point or an edged shape having two flat intersecting faces in which a line segment forms a vertex.

Next, the operation of the protecting cover will be described below.

In the case that the rotatable cover portion 30 is opened, the rotatable cover portion is lifted approximately 90° upward by using the axial line of the hinge portion 20 as the rotation center thereof as shown in FIG. 2. When the rotatable cover portion 30 is moved to its open position as described above, the two pairs of locking tabs 51 of the rotatable cover portion 30 are gradually inserted into the two pairs of locking frames 41 of the fixed cover portion 10.

When the locking tabs 51 are inserted into the locking frames 41, the locking protrusion 53 of each locking tab 51 slides on the locking edge 43 of the locking frame 41 while elastically making contact therewith, and the locking tab 51 advances further to the inside of the locking frame 41 while deflecting inward. Then, when the locking protrusion 53 passes the locking edge 43 of the locking frame 41 as the locking tab 51 advances, the locking tab 51 elastically returns outward, and the locking protrusion 53 is engaged with the locking edge 43 of the locking frame 41, whereby the rotatable cover portion 30 is held in its opened state. Consequently, work, such as mounting and dismounting of battery terminals, various connection terminals or other components, or the replacement of fuses, can be carried out easily while the opened state of the rotatable cover portion 30 is maintained.

When the rotatable cover portion 30 is moved to the open position as described above, the engaging portions 50A, 50B are engaged with the catching portions 40A, 40B at four positions in total (at the four locking tabs 51 and the four locking frames 41). Hence, the total engagement holding force therebetween can be enhanced without using a configuration in which the lapping amount (engagement amount) of the locking protrusion 53 and the locking edge 43 is increased by increasing the protrusion height of each locking protrusion 53. Consequently, the abrasion of the intermediate section of the locking protrusion 53 can be reduced in comparison with a case in which the protrusion height of the locking protrusion 53 is increased, and the locking protrusion can exhibit a sufficient engagement function even when the opening and closing operations is repeated.

In particular, since the pair of locking tabs 51 constituting each of the engaging portions 50A, 50B is provided with the locking protrusions 53 protruding outward bilaterally symmetrically with respect to the center line L1 between both the locking tabs 51, in each of the combinations of the engaging portions 50A, 50B and the catching portions 40A, 40B, the lateral forces that are generated when the locking tabs 51 are deflected as the engagement advances are cancelled with each other. Consequently, the shearing forces exerted to the hinge portion 20 can be decreased, and the durability of the hinge portion 20 against the repeated opening and closing operations can be enhanced.

Further, in the protecting cover 1, since the locking protrusions 53 are provided so as to protrude outward on the outside faces of the tip end sections of the pair of locking tabs 51 and the locking edges 43 of the pair of locking frames 41 are formed inward, the distances Fa and Fc between the respective pairs of locking tabs 51 can be minimized and the shearing forces exerted to the hinge portion 20 can be cancelled with each other within the small distances. Moreover, since the pair of locking frames 41 is formed into a bottomed cylindrical shape in which the recesses 42 are disposed so as to be opposed to each other in the direction perpendicular to the rotation face of the rotatable cover portion 30, the strength of the locking frames 41 can be improved. This makes it possible to contribute to the improvement of the engagement strength of the engaging portions 50A, 50B and the catching portions 40A, 40B.

Further, in the protecting cover 1, since the engaging portions 50A, 50B and the catching portions 40A, 40B are disposed on outer sides of respective ends of the hinge portion in the axial direction, the influence on the strength of the hinge portion 20 due to the disposition of the engaging portions 50A, 50B and the catching portions 40A, 40B can be reduced. Still further, since the distances Fa and Fc between the respective pairs of outside and inside locking tabs 51 are set smaller than the distance Fb between the two locking tabs 51 located inside the outside and inside pairs of locking tabs 51 constituting the respective engaging portions 50A, 50B, the locking tabs 51 being used as a pair are located close to each other, whereby the molding error between the locking tabs 51 due to the influence of resin flow during resin molding is small, whereby adverse influence on the performance of the engagement hardly occurs.

Further, in the protecting cover 1, since the side face of the front side of the locking protrusion 53 that is used when the locking tab 51 is engaged with the locking frame 41 is formed as the gentle upward sloping face 53a and the side face of the rear side thereof is formed as the steep downward sloping face 53b and since the side faces are located inside the outer peripheral face (the outer peripheral face is indicated by the broken line in FIG. 4) of the locking protrusion in the case that the locking protrusion is formed into a hemispherical shape, sliding resistance (also referred to as insertion force) at the time of the engagement (at the time of the insertion) can be decreased and the engagement force can be increased. Moreover, since the intermediate section extending from the gentle upward sloping face 53a to the steep downward sloping face 53b is formed as the flat cut face 53c being parallel to the rotation plane of the hinge portion 20, the abrasion of the locking protrusion 53 can be reduced when the rotatable cover portion 30 is opened and closed repeatedly. Consequently, the insertion force does not change each time the number of opening and closing operations increases during the period from the start of use until abrasion of the locking protrusion is advanced. That is, the rotatable cover portion can be opened and closed repeatedly by applying the insertion force (the sliding resistance at the time of the opening and closing operations) that remains unchanged from the start of use.

Figure 6:
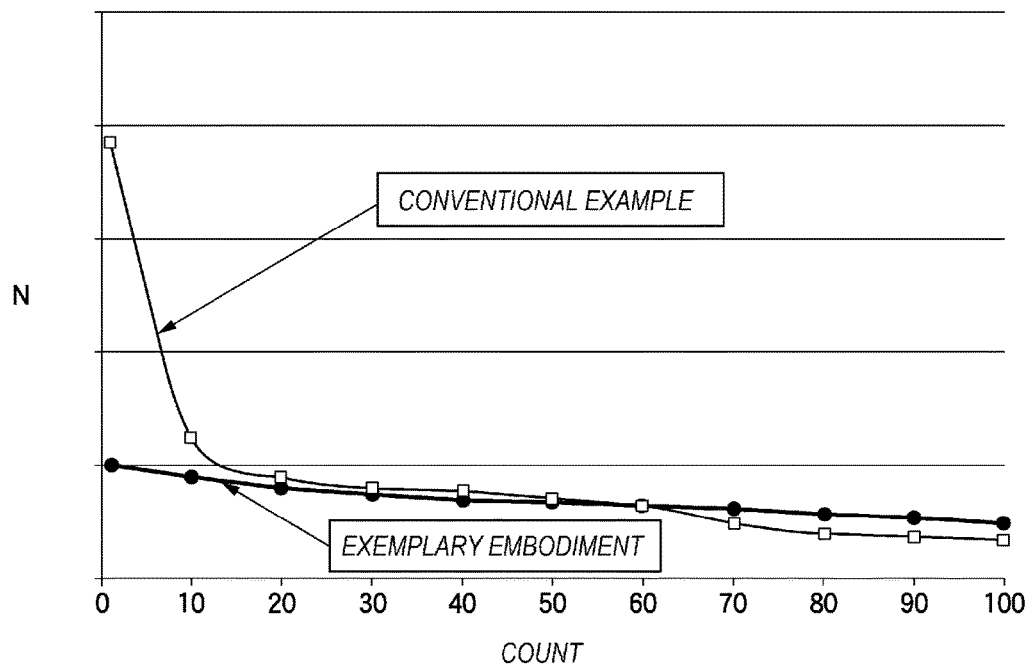
FIG. 6 is a chart for explaining a performance characteristic of the first exemplary embodiment.

FIG. 6 is a chart indicating the change in the insertion force of the engaging portions 50A, 50B applied to the catching portions 40A, 40B in the exemplary embodiment of the present invention in comparison with the insertion force in the conventional example depending on the number of opening and closing operations of the rotatable cover portion 30. As shown in FIG. 6, in the conventional example, the insertion force in the zone at the start of use in which the number of opening and closing operations is small, the insertion force for the engagement increases since the protrusion height of the locking protrusions is large, and the insertion force tends to decrease gradually as the abrasion of the locking protrusions advances. However, in the exemplary embodiment according to the present invention, since the abrasion of the locking protrusions 53 is reduced, the change in the insertion force decreases even when the number of opening and closing operations from the start of use increases. Consequently, the rotatable cover portion can be opened and closed by applying a constant insertion force regardless of the number of opening and closing operations.

Figure 7:
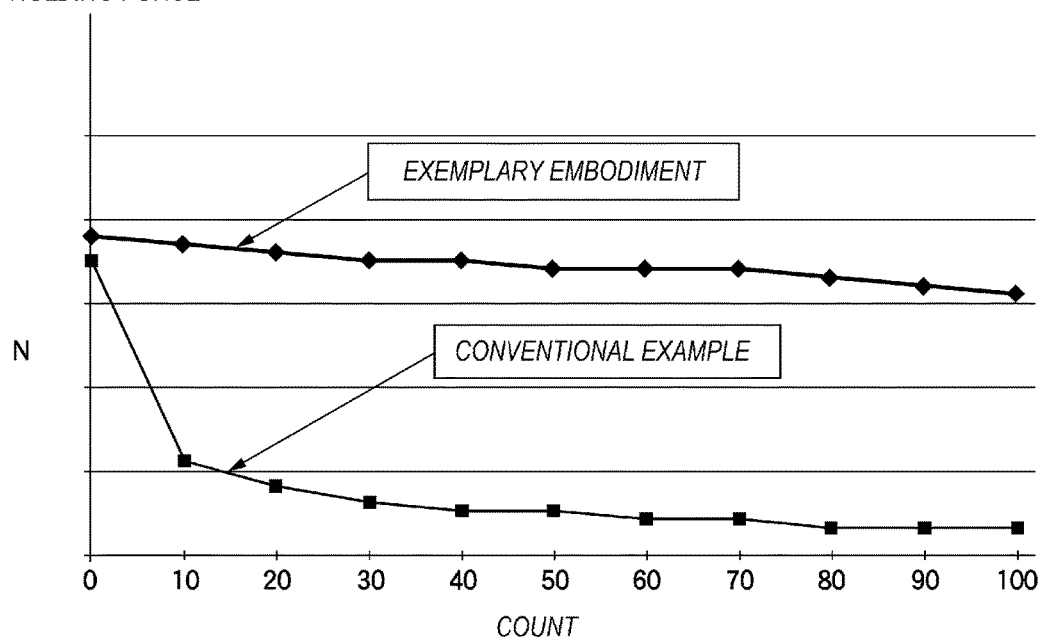
FIG. 7 is a chart for explaining another performance characteristic of the first exemplary embodiment.

FIG. 7 is a chart indicating the change in the engagement holding force exerted between the engaging portions 50A, 50B and the catching portions 40A, 40B in the exemplary embodiment of the present invention in comparison with the engagement holding force in the conventional example depending on the number of opening and closing operations of the rotatable cover portion 30. As shown in FIG. 7, in the conventional example, the holding force tends to decrease abruptly due to the influence of the abrasion of the locking protrusions as the number of opening and closing operations increases. However, in the exemplary embodiment according to the present invention, the holding force remains unchanged even when the number of opening and closing operations from the start of use increases.

Figure 8:
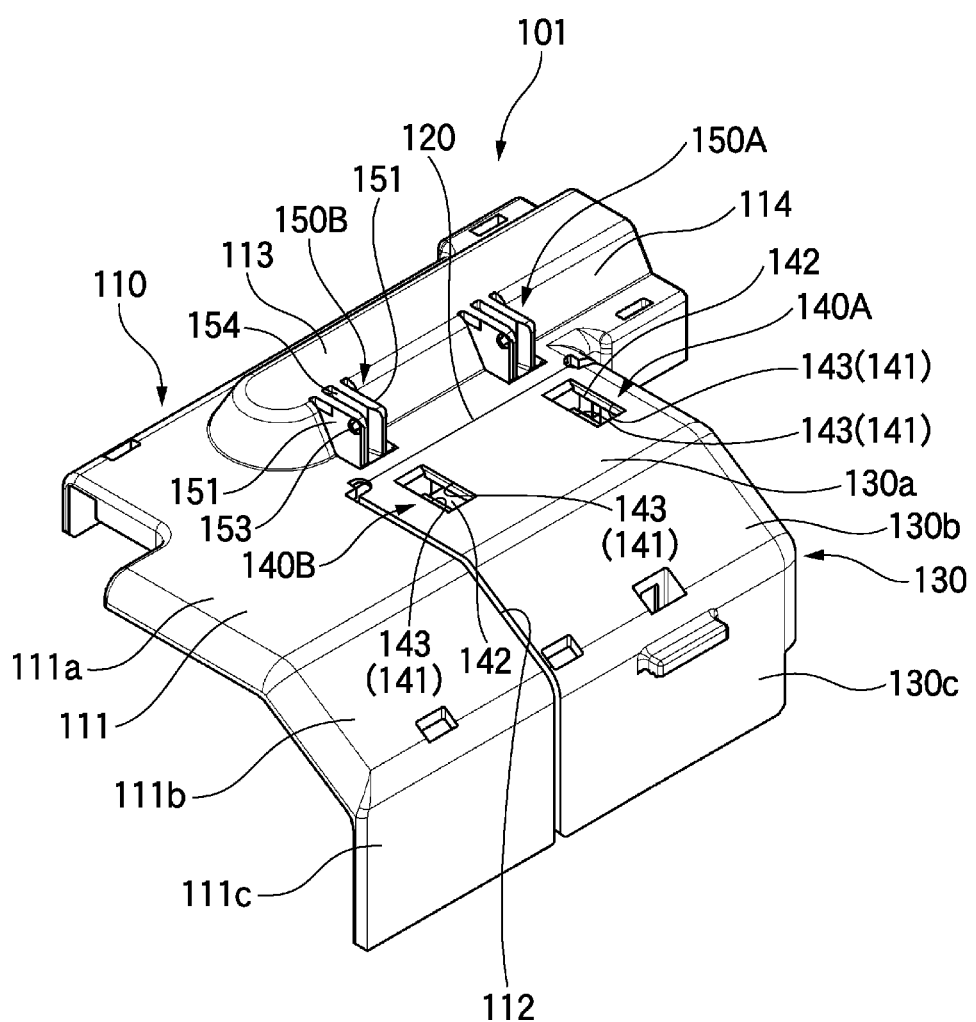
FIG. 8 is a perspective view of a protecting cover according to a second exemplary embodiment of the present invention, illustrating a state in which a rotatable cover portion thereof is closed.
Figure 9:
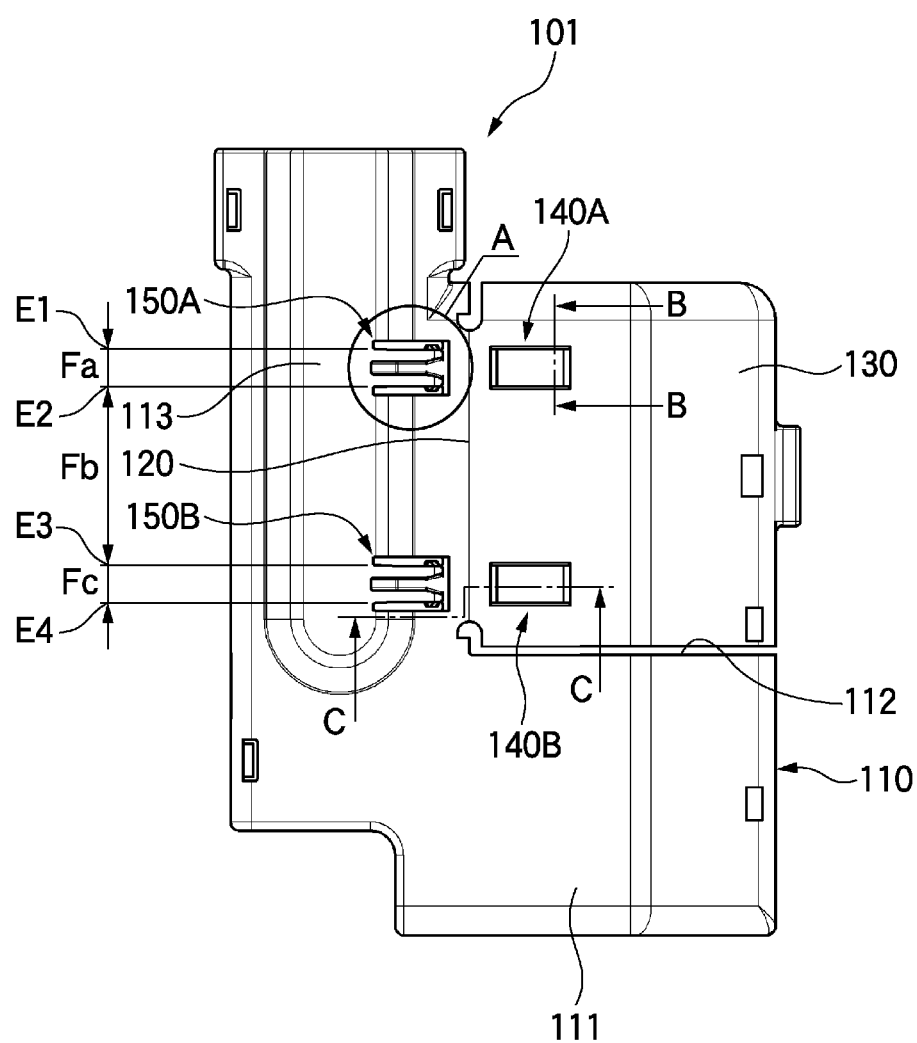
FIG. 9 is a plan view of the protecting cover according to the second exemplary embodiment with the rotatable cover portion being closed.
Figure 10:
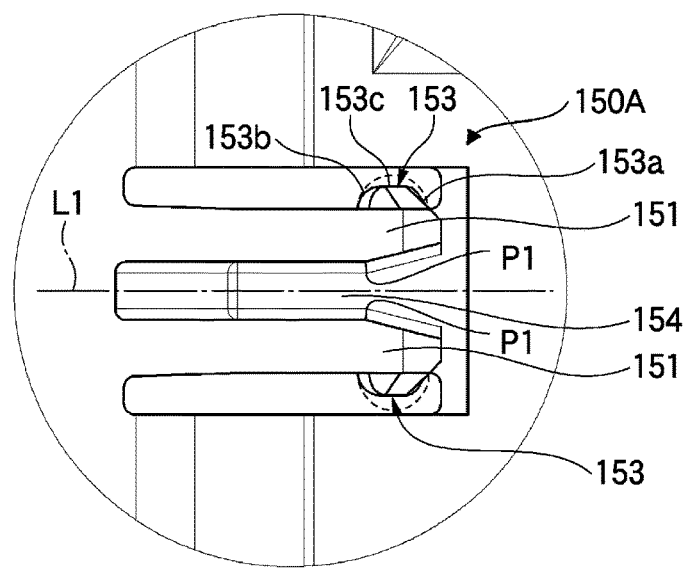
FIG. 10 is an enlarged view of the circular area A shown in FIG. 9.
Figure 11:
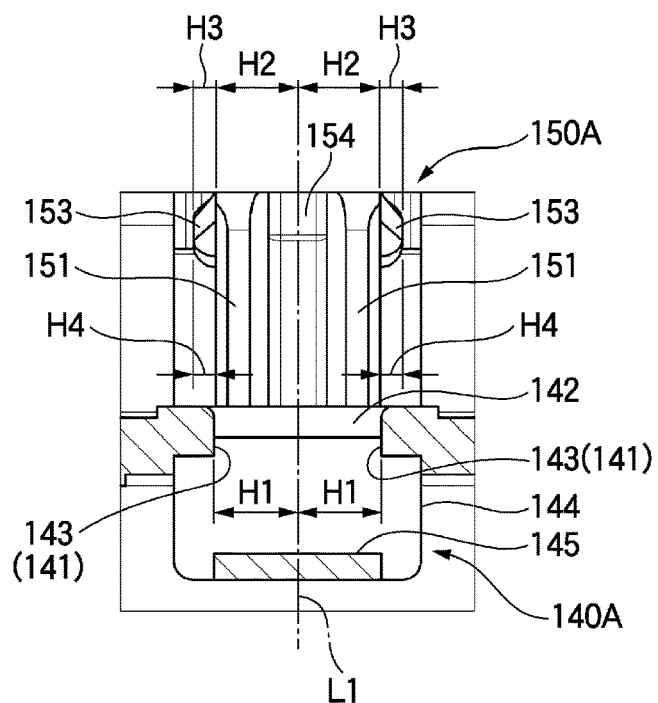
FIG. 11 is a cross-sectional view taken along the line B-B in FIG. 9.
Figure 12:
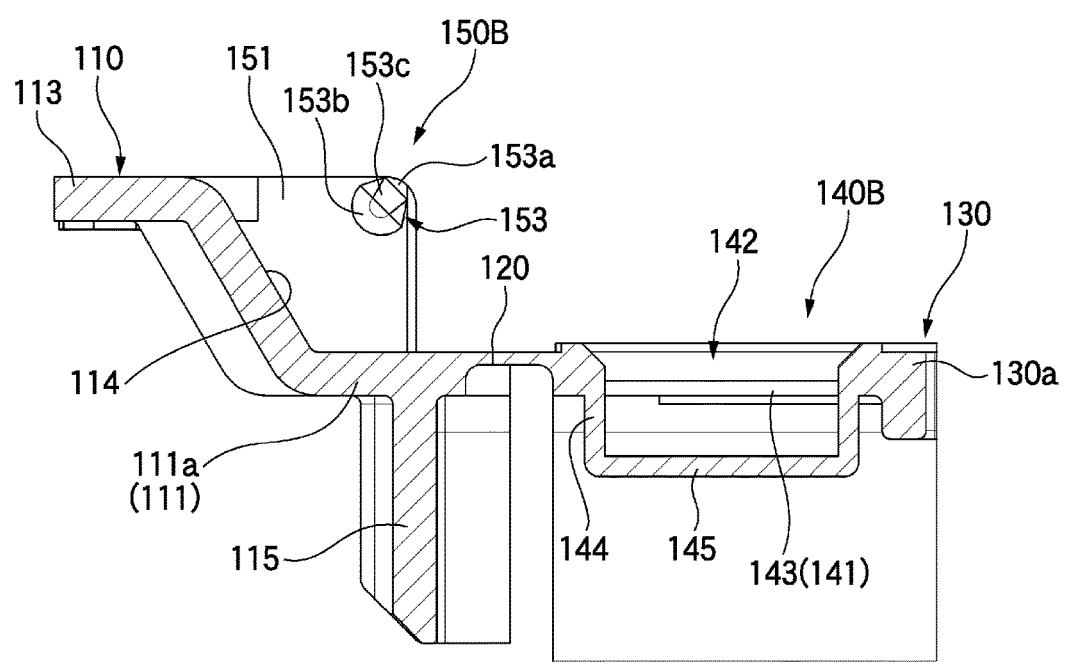
FIG. 12 is a cross-sectional view taken along the line C-C in FIG. 9.
Figure 13:
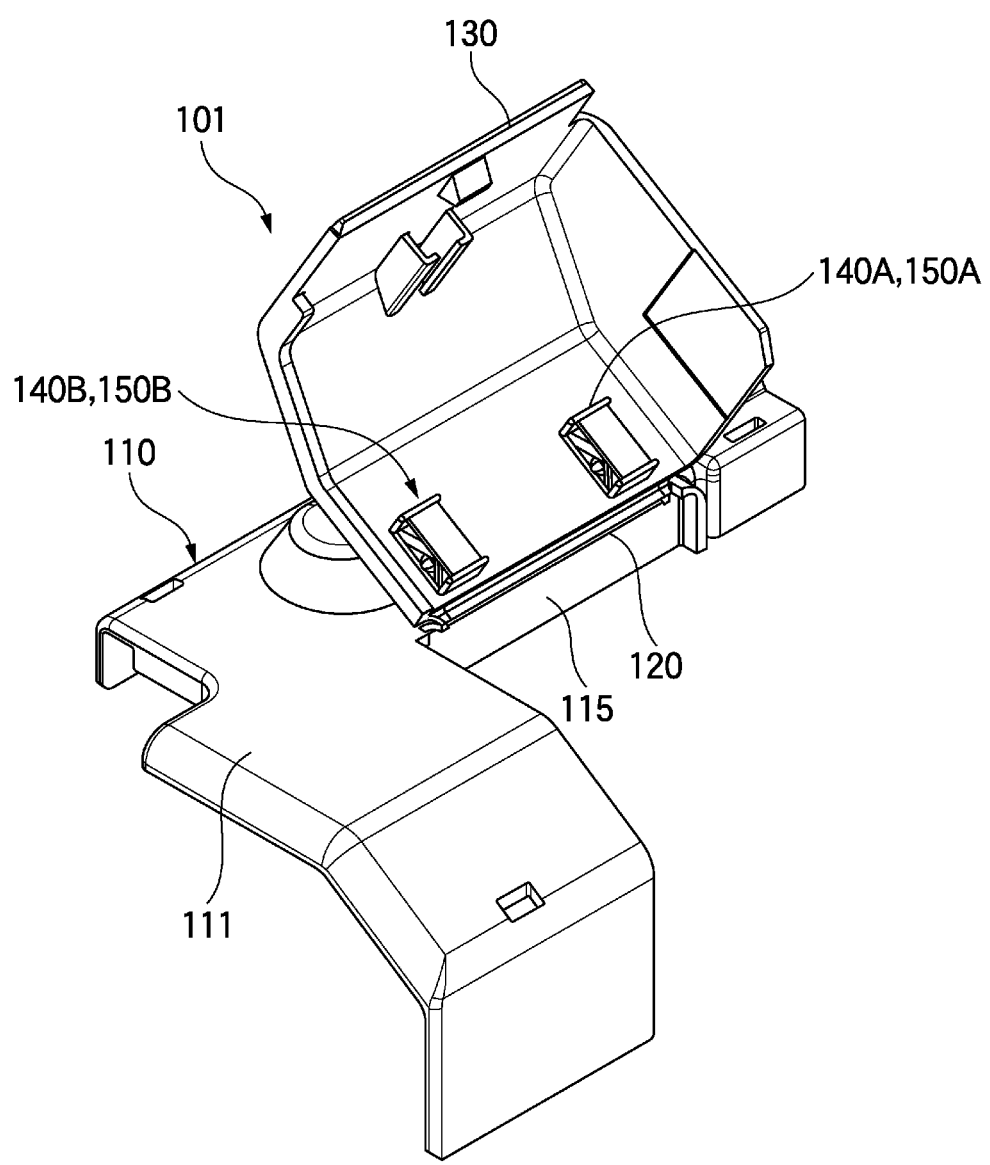
FIG. 13 is a perspective view of the protecting cover according to the second exemplary embodiment of the present invention, illustrating a state in which the rotatable cover portion thereof is opened.
Figure 14:
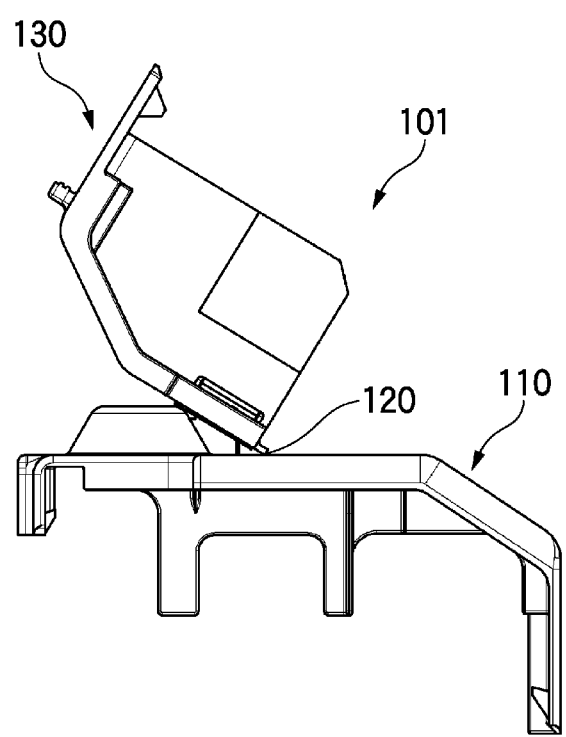
FIG. 14 is a side view of the protecting cover according to the second exemplary embodiment with the rotatable cover portion thereof being opened.
Figure 15:
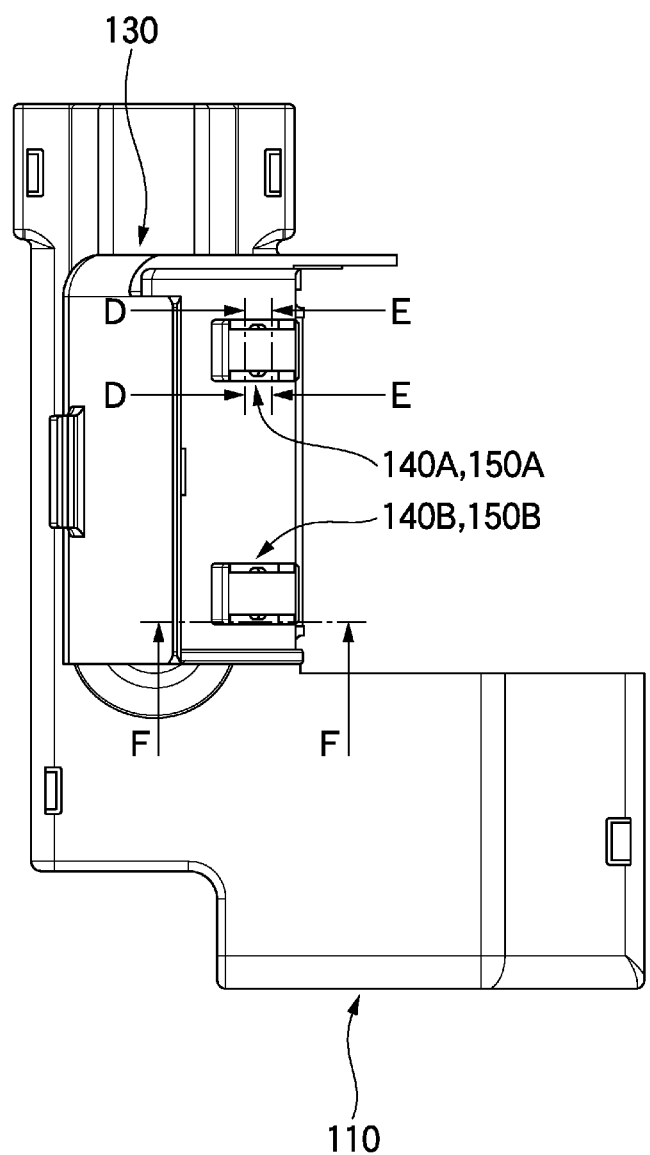
FIG. 15 is a plan view of the protecting cover according to the second exemplary embodiment with the rotatable cover portion thereof being opened.
Figure 16:
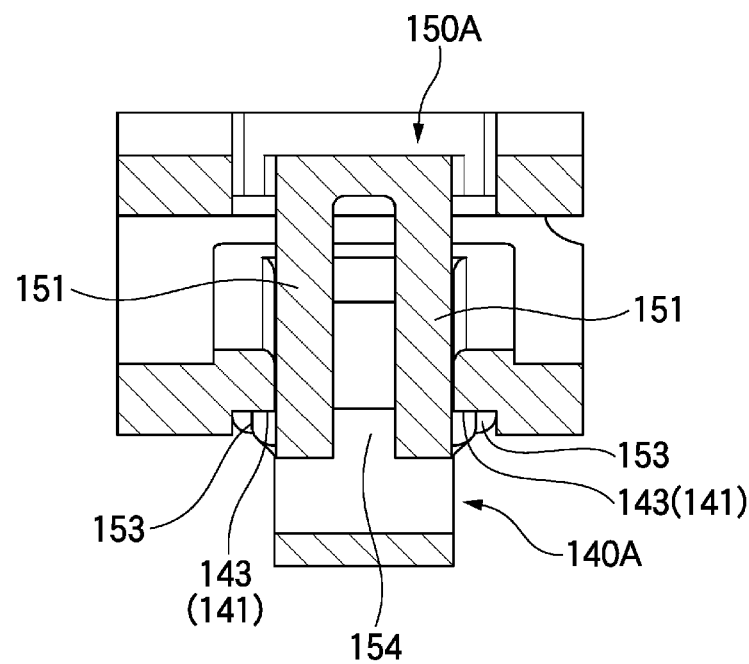
FIG. 16 is a cross-sectional view taken along the line D-D in FIG. 15.
Figure 17:
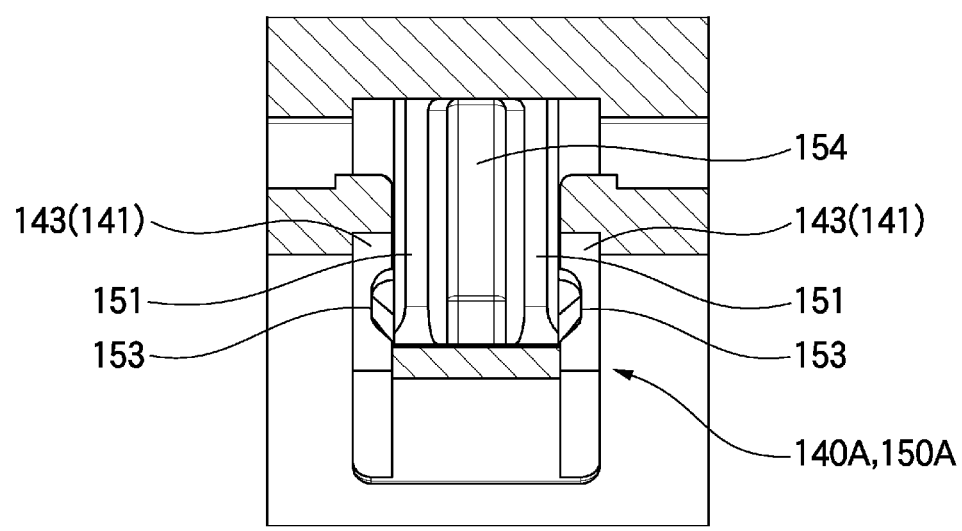
FIG. 17 is a cross-sectional view taken along the line E-E in FIG. 15.
Figure 18:
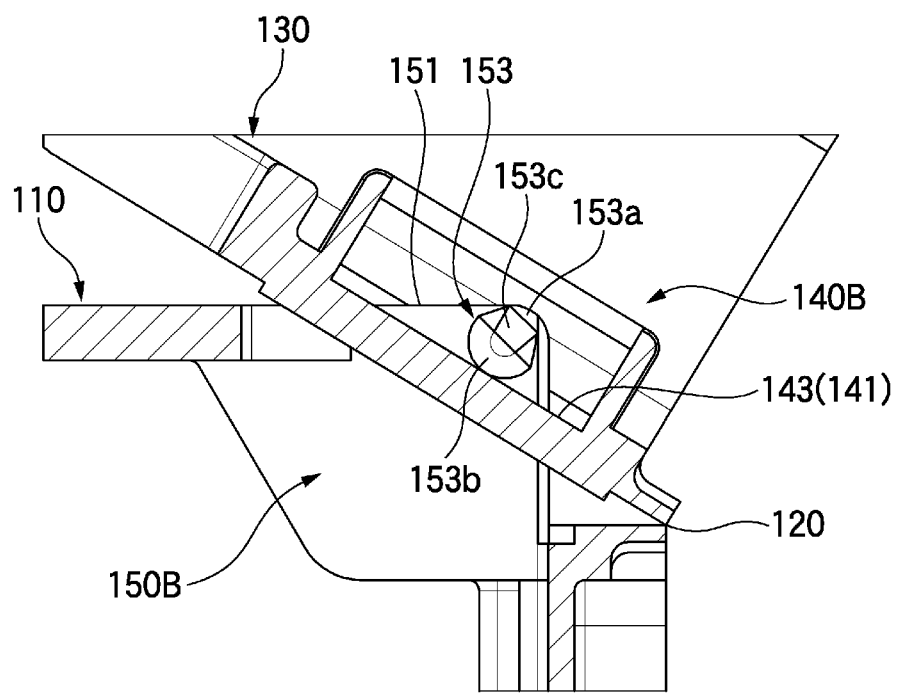
FIG. 18 is a cross-sectional view taken along the line F-F in FIG. 15.
Figure 19A:
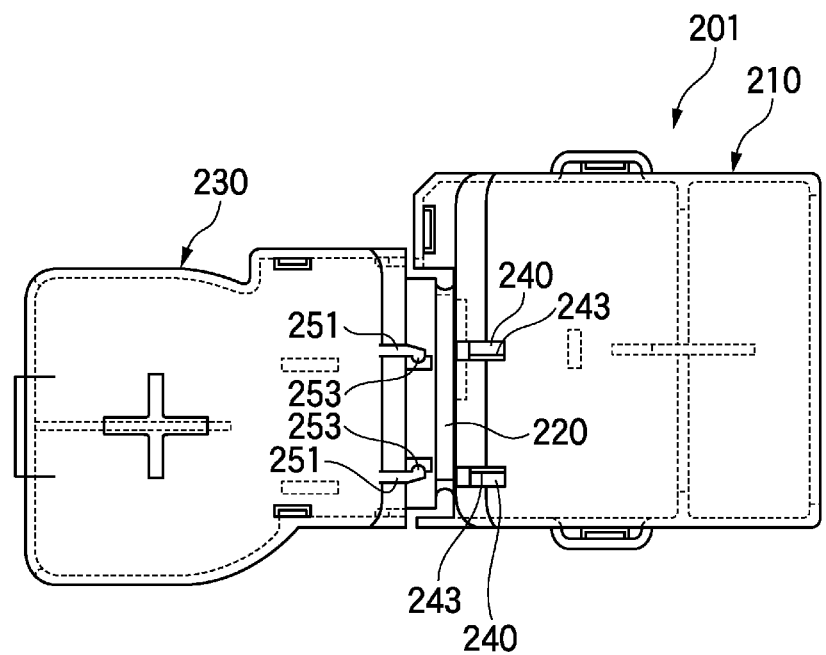
FIGS. 19A and 19B illustrate a configuration of a protecting cover according to a conventional example, FIG. 19A being a plan view and FIG. 19B being a side view.
Figure 19B:
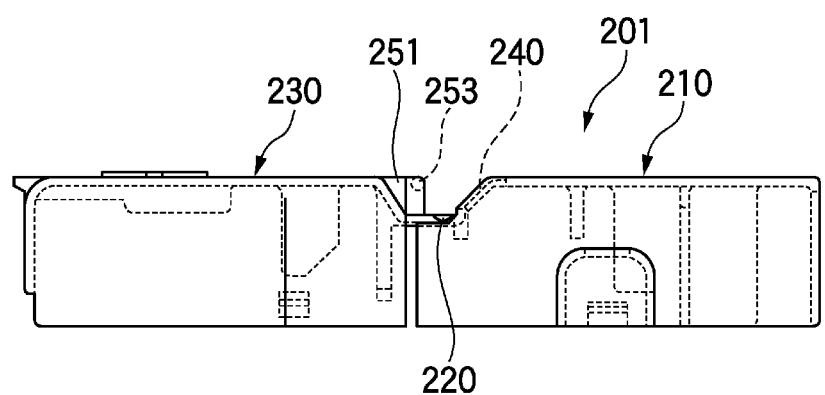
Figure 20:
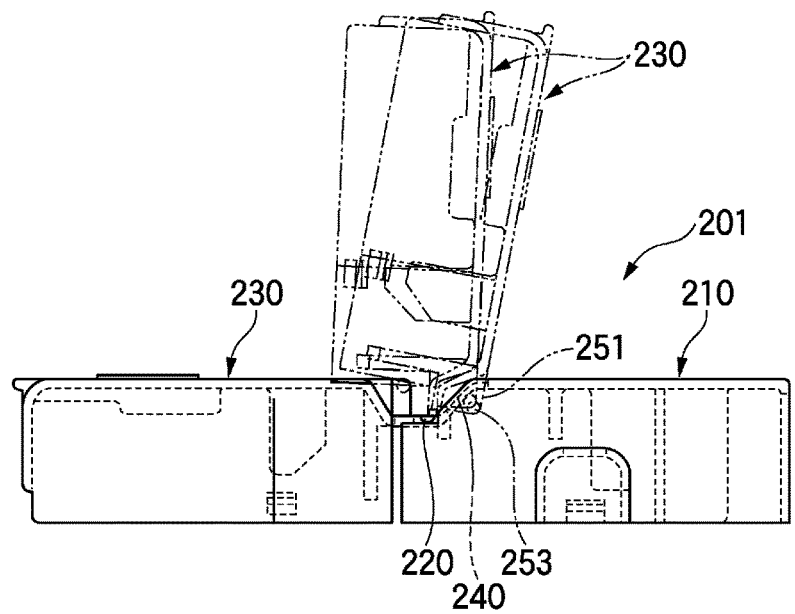
FIG. 20 is another side view of the protecting cover according to the conventional example, illustrating a state in which the rotatable cover portion is being opened or closed.
Figure 21:
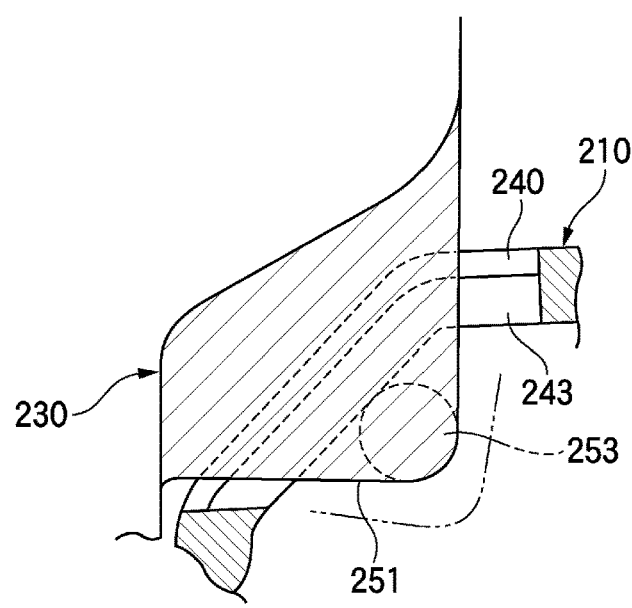
FIG. 21 is an enlarged view illustrating relevant parts of the protecting cover shown in FIGS. 19A and 19B.
Figure 22A:
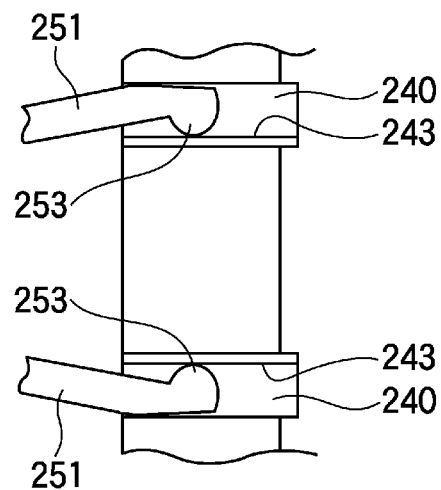
FIGS. 22A and 22B are explanatory views showing the engagement between the insertion tabs and the insertion hole sections according to the conventional example.
Figure 22B:
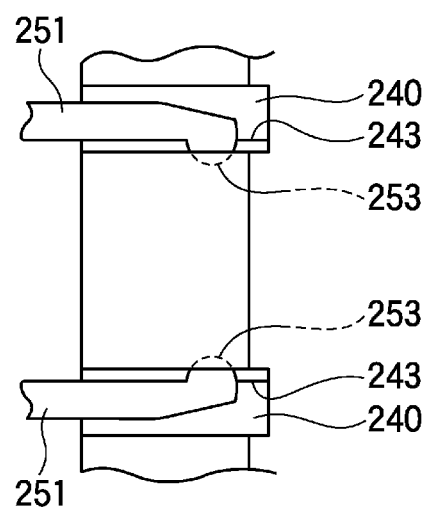

Next, a second exemplary embodiment according to the present invention will be described referring to FIGS. 8 to 18. FIG. 8 is a perspective view of a protecting cover according to a second exemplary embodiment, illustrating a state in which a rotatable cover portion thereof is closed, FIG. 9 is a plan view of the protecting cover; FIG. 10 is an enlarged view of the circular area A shown in FIG. 9; FIG. 11 is a cross-sectional view taken along the line B-B in FIG. 9; and FIG. 12 is a cross-sectional view taken along the line C-C in FIG. 9. FIG. 13 is a perspective view of the protecting cover according to the second exemplary embodiment with the rotatable cover portion thereof being opened; FIG. 14 is a side view of the protecting cover; FIG. 15 is a plan view of the protecting cover; FIG. 16 is a cross-sectional view taken along the line D-D in FIG. 15; FIG. 17 is a cross-sectional view taken along the line E-E in FIG. 15; and FIG. 18 is a cross-sectional view taken along the line F-F in FIG. 15.

In the first exemplary embodiment described above, as shown in FIG. 1, the locking tabs 51 serving as the engaging portions 50A, 50B are provided for the rotatable cover portion 30, the locking frames 41 serving as the catching portions 40A, 40B are provided for the fixed cover portion 10, and the locking frames 41 are formed into a bottomed cylindrical shape. However, the second exemplary embodiment is characterized as described below. As shown in FIG. 8, locking tabs 151 serving as engaging portions 150A, 150B are provided for the fixed cover portion 110 of a protecting cover 101, locking frames 141 serving as catching portions 140A, 140B are provided for the rotatable cover portion 130 of the protecting cover 101, and the locking frames 141 are formed of locking holes 142. Furthermore, the second exemplary embodiment differs from the first exemplary embodiment in that the engaging portions 150A, 150B and the catching portions 140A, 140B are disposed inside both the ends of a hinge portion 120 in the axial direction.

As shown in FIGS. 8 to 18, the protecting cover 101 is a protecting cover for a battery connection section and is entirely configured as an integrated resin-molded product. The protecting cover 101 has the fixed cover portion 110 mounted and fixed to the side of a battery to cover a battery terminal and a fuse unit directly mounted on a battery post and the rotatable cover portion 130 connected to the fixed cover portion 110 via the hinge portion 120 and capable of being opened and closed around the axis of the hinge portion 120 as the rotation center. Although a battery is taken as an example of an electronic component in this exemplary embodiment, the electronic component is not limited to the battery in the present invention. The present invention is also applicable to a protecting cover for electronic components, such as electric connection boxes and connectors.

The fixed cover portion 110 has a main body section 111 entirely formed into an L-shape in a plan view; a cut-out section 112 having a rectangular shape in a top view; and a rotation support portion 113 for supporting, via the hinge portion 120, the rotatable cover portion 130 fitted in the cut-out section 112. The battery connection section including such as the battery terminal and the fuse unit is disposed in the cut-out section 112. When the rotatable cover portion 130 is opened, work necessary for the battery connection section can be carried out.

The main body section 111 of the fixed cover portion 110 has an upper wall 111a, an inclined wall 111b connected to the upper wall, and a side wall 111c connected to the inclined wall so as to be able to cover portions to be protected. The rotation support portion 113 is raised one step higher than the upper wall 111a of the main body section 111, and an inclined face 114 being inclined downward to the upper face of the main body section 111 is provided at the peripheral edge section of the rotation support portion 113. Furthermore, the rotatable cover portion 130 has an upper wall 130a, an inclined wall 130b and a side wall 130c corresponding to the upper wall 111a, the inclined wall 111b and the side wall 111c of the main body section 111, respectively, so as to be able to cover portions to be protected similarly when the rotatable cover portion is closed. The upper wall 130a, the inclined wall 130b and the side wall 130c of the rotatable cover portion 130 are set so as to be flush with the upper wall 111a, the inclined wall 111b and the side wall 111c of the main body section 111, respectively, when the rotatable cover portion is closed.

The hinge portion 120 is located at the side edge of the cut-out section 112 having a rectangular shape on the side of the rotation support portion 113 and is formed linearly at the boundary section of the upper wall 111a of the main body section 111 and the upper wall 130a of the rotatable cover portion 130. The hinge portion 120 is made thinner than the upper wall 130a of the rotatable cover portion 130 and the upper wall 113a of the rotation support portion 113 of the fixed cover portion 110, thereby being made flexible. In addition, as shown in FIG. 12, a reinforcing rib 115 is provided on the lower face of the upper wall 111a of the main body section 111 near the hinge portion 120 so as to protrude therefrom.

Furthermore, on the inclined face 114 of the fixed cover portion 110 and the upper wall 130a of the rotatable cover portion 130 in the vicinity of both the end sections of the hinge portion 120 in the axial direction, the engaging portions 150A, 150B and the catching portions 140A, 140B that are engaged with each other to hold the rotatable cover portion 130 at its open position when the rotatable cover portion 130 is moved to the open position as shown in FIGS. 13 and 14 are respectively provided in the axial direction of the hinge portion 120.

Each of the engaging portions 150A, 150B has a pair of rib-shaped locking tabs 151 having a triangular shape in a side view. The locking tabs 151 used as a pair are respectively formed as protruding walls along the rotation face (the face perpendicular to the axial line of the hinge portion 120) of the rotatable cover portion 130 and disposed so as to be separated from each other in a direction perpendicular to the rotation face (in the axial direction of the hinge portion 120) and parallel to each other. Furthermore, the tip end sides of the locking tabs are formed so as to be deflectable in the direction perpendicular to the rotation face during the engagement. The pair of locking tabs 151 having a triangular shape in a side view is disposed on the portion ranging from the inclined face 114 of the fixed cover portion 110 to the upper wall 111a of the main body section 111. The protrusion dimension of the locking tab 151 is set so that the upper end edge of the locking tab 151 is as high as the upper face of the rotation support portion 113 that is raised from the upper wall 111a of the main body section 111.

As shown in FIG. 10, on the outside faces of the tip end sections of the pair of locking tabs 151, the tip end sections being deflectable in the direction perpendicular to the rotation face, locking protrusions 153 are provided so as to protrude outward bilaterally symmetrically with respect to the center line L1 (hereafter referred to as the "center line L1" of each of the engaging portions 150A, 150B and the catching portions 140A, 140B) between both the locking tabs 151. A deflection space (clearance) 154 for allowing both the locking tabs 151 to deflect by a required amount is secured between the inside faces of the pair of locking tabs 151. Since a taper is formed on the inside faces of the pair of locking tabs 151 so that the locking tabs become slender toward the tip ends thereof, the movable ranges of both the locking tabs 151 are widened.

On the other hand, as shown in FIG. 8, the catching portions 140A, 140B disposed so as to respectively correspond to the engaging portions 150A, 150B are each composed of a pair of locking frames 141 disposed so as to be separated from each other in the direction perpendicular to the rotation face (in the axial direction of the hinge portion 120). The pair of locking frames 141 has locking edges 143 with which the locking protrusions 153 of the locking tabs 151 are engaged by using the deflection of the locking tabs 151, and these locking edges 143 are opposed inward to each other on the sides on which the locking protrusions 153 are provided.

Although each of the pair of locking frames 141 described above may be configured as a pair of locking holes, the locking frame is formed as a single locking hole 142 that is obtained by combining a pair of locking holes in this exemplary embodiment. In addition, as shown in FIG. 11, the hole edge section of the locking hole 142 corresponding to the side provided with each locking protrusion 153 serves as the locking edge 143 that is engaged with the locking protrusion 153. In FIG. 11, the distance from the center line L1 to each of the pair of locking edges 143 opposed inward to each other is denoted by H1, the distance from the center line L1 to the outside face of the locking tab 151 is denoted by H2, the protrusion height of the locking protrusion 153 is denoted by H3, and the engagement amount (lapping amount) of the locking protrusion 153 with respect to the locking edge 143 is denoted by H4. Here, H1=H2 and H3=H4.

At two points P1 on the pair of locking tabs 151 where the pair of locking tabs 151 becomes closest to each other during the deflection, the sum (H3+H3) of the protrusion heights H3 of the locking protrusions 153 is smaller than the distance (S) between the pair of locking tabs 151 in a state in which the pair of locking tabs 151 are not deflected. With this configuration, the pair of locking tabs 151 does not make contact with each other at the time of the deflection, whereby the locking tabs 151 can deflect properly. In particular, by setting the distance between the non-deflected pair of locking tabs 151 to be slightly larger than the sum (H3+H3) of the protrusion heights of the locking protrusions 153 of the respective locking tab 151, the distance between the pair of locking tabs 151 can be minimized at the two points P1. Hence, in the pair of locking tabs 151 located at the above-mentioned positions, the molding error between the locking tabs 151 due to the influence of resin flow during resin molding is very small, whereby adverse influence on the performance of the engagement can be minimized.

The locking hole 142 may pass through the rotatable cover portion 130 in the thickness direction. However, in the case that the locking hole passes therethrough, foreign matter may enter the inside of the protecting cover 101 through the locking hole 142. Hence, the bottom of the locking hole 142 is covered with protection walls 144 and 145. These protection walls 144 and 145 also serve to reinforce the periphery of the locking hole 142.

In addition, as shown in FIGS. 8 and 9, the engaging portions 150A, 150B and the catching portions 140A, 140B are disposed inside both the ends of the hinge portion 120 in the axial direction. Furthermore, as shown in FIG. 9, the distances Fa and Fc between the respective pairs of outside and inside locking tabs 151 are set considerably smaller than the distance Fb between the two locking tabs 151 located inside the outside and inside pairs of locking tabs 151 constituting the respective engaging portions 150A, 150B.

This point will be described below in detail. In FIG. 9, the positions of the substantial engagement points of the four locking tabs 151 arranged from one side to the other side in the axial direction of the hinge portion 120 are denoted by E1, E2, E3 and E4. The distances between the pairs of two outside and inside locking tabs 151 are the distance Fa between E1 and E2 and the distance Fc between E3 and E4. The distance between the two locking tabs 151 located inside the respective pairs of locking tabs 151 is the distance Fb between E2 and E3. The distances Fa and Fc are set so as to be smaller than the distance Fb.

Still further, the locking protrusion 153 formed on the outside face of the locking tab 151 is configured as described below in detail. Referring to FIGS. 10 to 12, the front side face (the right side in FIG. 10) of the locking protrusion 153 is configured as a gentle upward sloping face 153 that makes slide contact with the locking edge 143 to gradually deflect the locking tab 151 when the rotatable cover portion 130 is first moved toward the open position. The rear side face (the left side in FIG. 10) thereof is configured as a steep downward sloping face 153b that makes slide contact with the locking edge 143 after the locking tab 151 slides over the gentle upward sloping face 153a through the deflection of the locking tab 151 and allows the locking tab 151 to gradually return from the deflected state to generate an engagement force between the locking tab 151 and the locking edge 143. The steep downward sloping face 153b has an inclination angle steeper than that of the sloping face 153a. The intermediate section extending from the gentle upward sloping face 153a to the steep downward sloping face 153b is formed as a flat cut face 153c that is parallel to the rotation plane of the hinge portion 120. Hence, the intermediate section is formed as a cut face having a vertex located on the side of the locking tab 151 away from the flat plane including the gentle upward sloping face 153a.

The cut face 153c extending from the gentle upward sloping face 153a to the steep downward sloping face 153b is located inside the outer peripheral face (the outer peripheral face is indicated by a broken line in FIG. 10) of the locking protrusion if the locking protrusion is formed to have a hemispherical shape. In particular, as shown in FIG. 10, the cut face 153c is located inside the outer peripheral face of the locking protrusion if the locking protrusion is formed to have a hemispherical shape having a diameter equal to the distance between the lower end of the gentle upward sloping face 153a and the lower end of the steep downward sloping face 153b. With this configuration, the steep downward sloping face 153b coincides with part of the outer peripheral face of the locking protrusion in the case that the locking protrusion is formed into the hemispherical shape. However, the shape of the locking protrusion being assumed to be formed into a hemispherical shape is not limited to such a hemispherical shape having the diameter equal to the distance between the lower end of the gentle upward sloping face 153a and the lower end of the steep downward sloping face 153b. It may be possible to assume that the shape of the locking protrusion is formed into a hemispherical shape having a diameter smaller than that equal to the distance between the lower end of the gentle upward sloping face 153a and the lower end of the steep downward sloping face 153b. Furthermore, although the surface shape of the intermediate section has been described as the cut face 153c, the shape of the intermediate section is not limited to such a flat plane shape but may be a curved shape. In other words, the shape may be a shape other than a conical shape rising toward one point or an edged shape having two flat intersecting faces in which a line segment forms a vertex.

When opening the rotatable cover portion 130, the rotatable cover portion 130 is lifted to a large angle exceeding 90° upward by using the axial line of the hinge portion 120 as the rotation center thereof as shown in FIGS. 13 and 14. When the rotatable cover portion 130 is moved to its open position as described above, the two pairs of locking tabs 151 of the fixed cover portion 110 are gradually inserted into the two pairs of locking holes 142 of the rotatable cover portion 130.

As shown in FIGS. 16 to 18, when the locking tabs 151 are inserted into the locking holes 142, the locking protrusion 153 of each locking tab 151 slides on the locking edge 143 provided on each of both sides of the locking hole 142 while elastically making contact therewith, and the locking tab 151 advances further to the inside of the locking hole 142 while deflecting inward. Then, when the locking protrusion 153 passes the locking edge 143 of the locking hole 142 as the locking tab 151 advances, the locking tab 151 elastically returns outward, and the locking protrusion 153 is engaged with the locking edge 143, whereby the rotatable cover portion 130 is held in its opened state. Consequently, work, such as mounting and dismounting of battery terminals, various connection terminals or other components, or the replacement of fuses, can be carried out easily while the opened state of the rotatable cover portion 130 is maintained.

When the rotatable cover portion 130 is moved to the open position as described above, the engaging portions 150A, 150B are engaged with the catching portions 140A, 140B at four positions in total (at the four locking protrusions 153 and the four locking edges 143). Hence, the total engagement holding force therebetween can be enhanced without using a configuration in which the lapping amount (engagement amount) of the locking protrusion 153 and the locking edge 143 is increased by increasing the protrusion height of each locking protrusion 153. Consequently, the abrasion of the intermediate section of the locking protrusion 153 can be reduced in comparison with a case in which the protrusion height of the locking protrusion 153 is increased, and the locking protrusion can exhibit a sufficient engagement function even when the opening and closing operations is repeated.

In particular, since the pair of locking tabs 151 constituting each of the engaging portions 150A, 150B is provided with the locking protrusions 153 protruding outward bilaterally symmetrically with respect to the center line L1 between both the locking tabs 151, in each of the combination of the engaging portions 150A, 150B and the catching portions 140A, 140B, the lateral forces that are generated when the locking tabs 151 are deflected as the engagement advances are cancelled with each other. Consequently, the shearing forces exerted to the hinge portion 120 can be decreased, and the durability of the hinge portion 120 against the repeated opening and closing operations can be enhanced.

Furthermore, in the protecting cover 101, since the locking protrusions 153 are provided so as to protrude outward on the outside faces of the tip end sections of the pair of locking tabs 151 and the locking edges 143 of the locking holes 142 are formed inward, the distances Fa and Fc between the respective pairs of locking tabs 151 can be minimized and the shearing forces exerted to the hinge portion 120 can be cancelled with each other within the small distances. Moreover, since the pair of locking holes corresponding to the pair of locking frames 141 is combined and configured as the single locking hole 142, a simple configuration with few protrusions can be obtained.

Moreover, in the protecting cover 101, since the distances Fa and Fc between the respective pairs of outside and inside locking tabs 151 are set smaller than the distance Fb between the two locking tabs 151 located inside the outside and inside pairs of locking tabs 151 constituting the respective engaging portions 150A, 150B, the locking tabs 151 being used as a pair are located close to each other, whereby the molding error between the locking tabs 151 due to the influence of resin flow during resin molding is small, whereby adverse influence on the performance of the engagement hardly occurs.

Furthermore, in the protecting cover 101, since the side face of the front side of the locking protrusion 153 that is used when the locking tab 151 is engaged with the locking hole 142 is formed as the gentle upward sloping face 153a and the side face of the rear side thereof is formed as the steep downward sloping face 153b, the sliding resistance (also referred to as insertion force) at the time of the engagement (at the time of the insertion) can be decreased and the engagement force can be increased. Moreover, since the intermediate section extending from the gentle upward sloping face 153a to the steep downward sloping face 153b is formed as the flat cut face 153c being parallel to the rotation plane of the hinge portion 120 and since the intermediate section is located inside the outer peripheral face (the outer peripheral face is indicated by the broken line in FIG. 10) of the locking protrusion in the case that the locking protrusion is formed into a hemispherical shape, the abrasion of the locking protrusion 153 can be reduced when the rotatable cover portion 130 is opened and closed repeatedly. Consequently, the insertion force does not change each time the number of opening and closing operations increases during a period from the start of use until the advancement of abrasion of the locking protrusion. That is, the rotatable cover portion can be opened and closed repeatedly by applying the insertion force (the sliding resistance at the time of opening and closing operations) that remains unchanged from the start of use.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims. In addition, the materials, shapes, dimensions, quantities, arranging locations and the like of the respective components in the exemplary embodiments described above are optional and not limited in so far as the present invention is achieved.

For example, while the locking protrusions 53 are formed outward on the outside faces of the locking tabs 51 in the first exemplary embodiment described above, the locking protrusions 53 may be formed inward on the inside faces of the locking tabs 51 so as to be bilaterally symmetrical with respect to the center line L1 between the two locking tabs 51. In this case, the pair of locking frames 41 may be formed so that the locking edges 43 to be engaged with the locking protrusions 53 are provided outward so as to correspond to the side on which the locking protrusions 53 are provided. Hence, the pair of locking frames 41 may be formed as a single structure.

Similarly, while the locking protrusions 153 are formed outward on the outside faces of the locking tabs 151 has been described in the second exemplary embodiment described above, the locking protrusions 153 may be formed inward on the inside faces of the locking tabs 151 so as to be bilaterally symmetrical with respect to the center line L1 between the two locking tabs 151. In this case, the locking holes corresponding to the pair of locking frames 141 may be provided separately, instead of being combined in a single structure as in the second exemplary embodiment, and may be formed so that the locking edges 143 to be engaged with the locking protrusions 153 are provided outward so as to correspond to the side on which the locking protrusions 153 are provided.

Furthermore, while the engaging portions 50A, 50B each having the pair of locking tabs 51 are provided on the side of the rotatable cover portion 30 and the catching portions 40A, 40B each having the pair of locking frames 41 are provided on the side of the fixed cover portion 10 in the first exemplary embodiment described above, the catching portions 40A, 40B each having the pair of locking frames 41 may be provided on the side of the rotatable cover portion 30 and the engaging portions 50A, 50B each having the pair of locking tabs 51 may be provided on the side of the fixed cover portion 10.

Similarly, while the engaging portions 150A, 150B each having the pair of locking tabs 151 are provided on the side of the fixed cover portion 110 and the catching portions 140A, 140B each having the pair of locking frames 141 (corresponding to the locking holes 142) are provided on the side of the rotatable cover portion 130, the catching portions 140A, 140B each having the pair of locking frames 141 (corresponding to the locking holes 142) may be provided on the side of the rotatable cover portion 130 and the engaging portions 150A, 150B each having the pair of locking tabs 151 may be provided on the side of the fixed cover portion 110.

According to an illustrative aspect of the present invention, an electronic component protecting cover (1) includes a fixed cover portion (10) configured to be mounted on an electronic component in a fixed manner, a hinge portion (20), and a rotatable cover portion (30) connected to the fixed cover portion via the hinge portion such that the rotatable cover portion (30) is operable to be opened and closed around an axis of the hinge portion as a rotation center. One of the fixed cover portion and the rotatable cover portion has engaging portions (50A, 50B) at two locations along an axial direction of the hinge portion, and the other of the fixed cover portion and the rotatable cover portion has catching portions (40A, 40B) at two locations along the axial direction of the hinge portion, the engaging portions and the catching portions being configured such that, when the rotatable cover portion is moved to an open position, the engaging portions and the catching portions are engaged with each other to hold the rotatable cover portion at the open position. Each of the engaging portions has a pair of rib-shaped locking tabs (51) disposed so as to be separated from each other in the axial direction of the hinge portion and parallel to each other, the locking tabs are configured to deflect in the axial direction of the hinge portion during the engagement of the engaging portions and the catching portions, and the locking tabs has locking protrusions (53) protruding outwardly from outside faces of the locking tabs or inwardly from inside faces of the locking tabs bilaterally symmetrically with respect to a center line between the locking tabs. Each of the catching portions has a pair of locking frames (41) disposed so as to be separated from each other in the axial direction of the hinge portion and parallel to each other, the locking frames are configured to be engaged with the locking protrusions of the pair of locking tabs through the deflection of the locking tabs, and the locking frames has locking edges (43) configured to be engaged with the locking protrusions, the locking edges being provided inwardly or outwardly on sides on which the locking protrusions of the corresponding locking tabs are provided. A distance between the pair of locking tabs is smaller than a distance between one of the locking tabs of one of the engaging portions and located on a side of the other of the engaging portions and one of the locking tabs of the other of the engaging portions located on a side of the one of the engaging portions.

With this configuration, the locking tabs being used as a pair are located close to each other, whereby the molding error between the locking tabs due to the influence of resin flow during resin molding is small, and adverse influence on the performance of the engagement hardly occurs. Furthermore, since the engaging portions are engaged with the catching portions at four positions in total when the rotatable cover portion is moved to its open position, the total engagement holding force therebetween can be enhanced without increasing the protrusion height of the locking protrusion. Consequently, the abrasion of the locking protrusion can be reduced in comparison with a case in which the protrusion height of the locking protrusion is increased, and the locking protrusion can exhibit a sufficient engagement function even when the opening and closing operations is repeated. In particular, since the pair of locking tabs constituting each of the engaging portions is provided with the locking protrusions protruding outward or inward bilaterally symmetrically with respect to the center line between both the locking tabs, in each combination of the engaging portions and the catching portions, the lateral forces that are generated when the locking tabs are deflected as the engagement advances are cancelled with each other. Consequently, the shearing forces exerted to the hinge portion can be decreased, and the durability of the hinge portion can be enhanced.

According to another illustrative aspect of the present invention, an electronic component protecting cover (1) includes a fixed cover portion (10) configured to be mounted on an electronic component in a fixed manner, a hinge portion (20), and a rotatable cover portion (30) connected to the fixed cover portion via the hinge portion such that the rotatable cover portion is operable to be opened and closed around an axis of the hinge portion as a rotation center. One of the fixed cover portion and the rotatable cover portion has an engaging portion (50A, 50B), and the other of the fixed cover portion and the rotatable cover portion has a catching portion (40A, 40B), the engaging portion and the catching portion being configured such that, when the rotatable cover portion is moved to an open position, the engaging portion and the catching portion are engaged with each other to hold the rotatable cover portion at the open position. The engaging portion has a locking tab (51) formed so as to be perpendicular to an axial direction of the hinge portion, the locking tab is configured to deflect in the axial direction of the hinge portion during the engagement between the engaging portion and the catching portion, and the locking tab has a locking protrusion (53) protruding outwardly from an outside face of the locking tab or inwardly from an inside face of the locking tab. The catching portion has a locking frame (41) configured to be engaged with the locking protrusion of the locking tab through the deflection of the locking tab, and the locking frame has a locking edge (43) configured to be engaged with the locking protrusion, the locking edge being provided inwardly or outwardly on a side on which the locking protrusion of the locking tab is provided. The locking protrusion has a front side face configured as an upward sloping face (53a, 153a) that makes slide contact with the locking edge to gradually deflect the locking tab when the rotatable cover portion is first moved toward the open position, a rear side face configured as a downward sloping face (53b, 153b) that makes slide contact with the locking edge after locking tab slides over the upward sloping face through the deflection of the locking tab and allows the locking tab to gradually return from the deflected state to generate an engagement force between the locking tab and the locking edge, the downward sloping face being steeper than the upward sloping face, and a intermediate section (53c, 153c) extending from the upward sloping face to the downward sloping face and having a curved or flat surface, the intermediate section located inside an outer peripheral face of the locking protrusion if the locking protrusion is formed to have a hemispherical shape. The downward sloping face (153b) may coincide with a portion of the outer peripheral face of the locking protrusion if the locking protrusion is formed to have the hemispherical shape. A diameter of the hemispherical shape may correspond to a distance between a lower end of the upward sloping face (53a) and a lower end of the downward sloping face (53b).

With this configuration, since the side face of the front side of the locking protrusion that is used when the locking tab is engaged with the locking frame is formed as the gentle upward sloping face and the side face of the rear side thereof is formed as the steep downward sloping face, sliding resistance (insertion force: the operation force at the time of the engagement) at the time of the engagement (at the time of the insertion) can be decreased and the workability at the time of the engagement can be improved, and the engagement holding force can be increased. Furthermore, since the intermediate section extending from the gentle upward sloping face to the steep downward sloping face is located inside the outer peripheral face of the locking protrusion in the case that the locking protrusion is formed into a hemispherical shape, the abrasion of the locking protrusion can be reduced when the rotatable cover portion is opened and closed repeatedly. Consequently, the insertion force (the operation force at the time of the engagement) does not change each time the number of opening and closing operations increases during the period from the start of use until the advancement of abrasion of the locking protrusion. That is, the rotatable cover portion can be opened and closed repeatedly by applying the insertion force that remains unchanged after the start of use, and the lowering of the engagement holding force due to the repeated opening and closing operations of the rotatable cover portion can be prevented. Moreover, since the locking protrusions are provided on the side faces of the tip end sections of the locking tabs constituting each engaging portion so as to protrude outward or inward, the lateral forces that are generated when the locking tabs are deflected as the engagement advances are cancelled with each other. Consequently, the shearing forces exerted to the hinge portion can be decreased, and the durability of the hinge portion can be enhanced. Further, while the intermediate section is located inside the outer peripheral face of the locking protrusion in the case that the locking protrusion is formed to have a hemispherical shape, the locking protrusion can be made compact.

The surface of the intermediate section may be configured as a flat cut face. With this configuration, the shape of the intermediate section is simple, so that the shape of the locking protrusion can be simplified.

The engaging portion may be formed at two locations along the axial direction of the hinge portion, and the catching portion may be formed at two locations along the axial direction of the hinge portion. Each engaging portion may have a pair of rib-shaped locking tabs disposed so as to be separated from each other in the axial direction of the hinge portion and parallel to each other, and the locking tabs may have locking protrusions protruding outwardly from outside faces of the locking tabs or inwardly from inside faces of the locking tabs bilaterally symmetrically with respect to a center line between the locking tabs. Each of the catching portion may have a pair of locking frames disposed so as to be separated from each other in the axial direction of the hinge portion and parallel to each other, and the locking frames may have locking edges configured to be engaged with the locking protrusions, the locking edges being formed inwardly or outwardly on sides on which the locking protrusions of the corresponding locking tabs are provided. A distance between the pair of locking tabs may be smaller than a distance between one of the locking tabs of one of the engaging portions located on a side of the other of the engaging portions and one of the locking tabs of the other of the engaging portions located on a side of the one of the engaging portions.

With this configuration, the locking tabs being used as a pair are located close to each other, whereby the molding error between the locking tabs due to the influence of resin flow during resin molding is small, and adverse influence on the performance of the engagement hardly occurs. Furthermore, since the engaging portions are engaged with the catching portions at four positions in total when the rotatable cover portion is moved to its open position, the total engagement holding force therebetween can be enhanced without increasing the protrusion height of the locking protrusion. Consequently, the abrasion of the locking protrusion can be reduced in comparison with a case in which the protrusion height of the locking protrusion is increased, and the locking protrusion can exhibit a sufficient engagement function even when the opening and closing operations is repeated. In particular, since the pair of locking tabs constituting each of the engaging portions is provided with the locking protrusions protruding outward or inward bilaterally symmetrically with respect to the center line between both the locking tabs, in each combination of the engaging portions and the catching portions, the lateral forces that are generated when the locking tabs are deflected as the engagement advances are cancelled with each other. Consequently, the shearing forces exerted to the hinge portion can be decreased, and the durability of the hinge portion can be enhanced.

The locking protrusions may be outwardly protruded from the outside faces of the locking tabs bilaterally symmetrically with respect to the center line between the locking tabs, and at two points (P1) on the pair of locking tabs where the pair of locking tabs becomes closest to each other during the deflection, a distance (S) between the pair of locking tabs in a state in which the pair of locking tabs are deflected may be larger than a sum (H3+H3) of protrusion heights of the locking protrusions of the locking tabs.

At the two points where the pair of locking tabs becomes closest to each other during the deflection, the distance between the pair of locking tabs in the state in which the pair of locking tabs are not deflected may be slightly larger than the sum of the protrusion heights of the respective locking protrusions of the locking tabs.

With this configuration, at the two points where the pair of locking tabs becomes closest to each other during the deflection, the distance between the pair of locking tabs in a state in which the pair of locking tabs are not deflected is larger than the sum of the protrusion heights of the respective locking protrusions of the locking tabs. Hence, the pair of locking tabs does not make contact with each other even when the locking tabs deflect most significantly, whereby the locking tabs can deflect properly. In particular, by setting the distance between the pair of non-deflected locking tabs to be slightly larger than the sum of the protrusion heights of the locking protrusions of the respective locking tabs, the distance between the pair of locking tabs can be minimized. Hence, in the pair of locking tabs located at the above-mentioned positions, the molding error between the locking tabs due to the influence of resin flow during resin molding is very small, whereby adverse influence on the performance of the engagement can be minimized.

The locking edges of the locking frames configured to be engaged with the locking protrusions may be formed inwardly on the sides on which the locking protrusions of the corresponding locking tabs are provided, and the locking frames may have recesses (42) opposed to each other in the axial direction of the hinge portion such that each of each of the locking frames has a bottomed cylindrical shape, and the locking edges may be configured as edges of peripheral walls of the recesses.

With this configuration, since the locking protrusions are provided so as to protrude outward on the outside faces of the pair of locking tabs and the locking edges of the pair of locking frames are formed inward, the distances between the respective pairs of locking tabs can be minimized and the shearing forces exerted to the hinge portion can be cancelled with each other within the small distances. Moreover, since the pair of locking frames is formed into a bottomed cylindrical shape in which the recesses are disposed so as to be opposed to each other in the axial direction of the hinge portion, the strength of the locking frames can be improved. This makes it possible to contribute to the improvement of the engagement strength of the engaging portions and the catching portions.

Each of the locking frames may be configured as a locking hole (142), and the hole edge sections of the locking hole provided on the sides on which the locking protrusions of the corresponding locking tabs are provided may be configured as the locking edges (143).

With this configuration, since the locking protrusions are provided so as to protrude outward on the outside faces of the pair of locking tabs, the distances between the respective pairs of locking tabs can be minimized and the shearing forces exerted to the hinge portion can be cancelled with each other within the small distances. Furthermore, since each of the pair of locking frames has a pair of locking holes or a single locking hole formed by combining the pair of locking holes, a simple configuration with few protrusions is obtained.

The engaging portions and the catching portions may be disposed on outer sides of respective ends of the hinge portion in the axial direction.

With this configuration, since the engaging portions and the catching portions are disposed on outer sides of respective ends of the hinge portion in the axial direction; in other words, since the engaging portions and the catching portions are not disposed at the hinge portion, the influence on the strength of the hinge portion due to the disposition of the engaging portions and the catching portions can be reduced.

What is claimed is:

1. An electronic component protecting cover comprising a fixed cover portion configured to be mounted on an electronic component in a fixed manner, a hinge portion, and a rotatable cover portion connected to the fixed cover portion via the hinge portion such that the rotatable cover portion is operable to be opened and closed around an axis of the hinge portion as a rotation center, wherein one of the fixed cover portion and the rotatable cover portion has engaging portions at two locations along an axial direction of the hinge portion, and the other of the fixed cover portion and the rotatable cover portion has catching portions at two locations along the axial direction of the hinge portion, the engaging portions and the catching portions being configured such that, when the rotatable cover portion is moved to an open position, the engaging portions and the catching portions are engaged with each other to hold the rotatable cover portion at the open position, wherein each of the engaging portions has a pair of rib-shaped locking tabs disposed so as to be separated from each other in the axial direction of the hinge portion and parallel to each other, the locking tabs are configured to deflect in the axial direction of the hinge portion during the engagement of the engaging portions and the catching portions, and the locking tabs have locking protrusions protruding outwardly from outside faces of the locking tabs or inwardly from inside faces of the locking tabs bilaterally symmetrically with respect to a center line between the locking tabs, wherein each of the catching portions has a pair of locking frames disposed so as to be separated from each other in the axial direction of the hinge portion and parallel to each other, the locking frames are configured to be engaged with the locking protrusions of the pair of locking tabs through the deflection of the locking tabs, and the locking frames has locking edges configured to be engaged with the locking protrusions, the locking edges being provided inwardly or outwardly on sides on which the locking protrusions of the corresponding locking tabs are provided, wherein a distance between the pair of locking tabs is smaller than a distance between one of the locking tabs of one of the engaging portions and located on a side of the other of the engaging portions and one of the locking tabs of the other of the engaging portions located on a side of the one of the engaging portions.

2. The electronic component protecting cover according to claim 1, wherein the locking protrusions are outwardly protruded from the outside faces of the locking tabs bilaterally symmetrically with respect to the center line between the locking tabs, and wherein at two points on the pair of locking tabs where the pair of locking tabs becomes closest to each other during the deflection, a distance between the pair of locking tabs in a state in which the pair of locking tabs are deflected is larger than a sum of protrusion heights of the locking protrusions of the locking tabs.

3. The electronic component protecting cover according to claim 2, wherein the locking edges of the locking frames configured to be engaged with the locking protrusions are formed inwardly on the sides on which the locking protrusions of the corresponding locking tabs are provided, and the locking frames have recesses opposed to each other in the axial direction of the hinge portion such that each of the locking frames has a bottomed cylindrical shape, and the locking edges are configured as edges of peripheral walls of the recesses.

4. The electronic component protecting cover according to claim 2, wherein each of the locking frames is configured as a locking hole, and the hole edge sections of the locking hole provided on the sides on which the locking protrusions of the corresponding locking tabs are provided are configured as the locking edges.

5. The electronic component protecting cover according to claim 1, wherein the engaging portions and the catching portions are disposed on outer sides of respective ends of the hinge portion in the axial direction.

6. The electronic component protecting cover according to claim 1, wherein during the engagement of the engaging portions and the catching portions, for each pair of rib-shaped locking tabs, a clearance is defined directly by and between respective distal ends of each of the locking tabs of the pair of rib-shaped locking tabs.

7. An electronic component protecting cover comprising a fixed cover portion configured to be mounted on an electronic component in a fixed manner, a hinge portion, and a rotatable cover portion connected to the fixed cover portion via the hinge portion such that the rotatable cover portion is operable to be opened and closed around an axis of the hinge portion as a rotation center, wherein one of the fixed cover portion and the rotatable cover portion has an engaging portion, and the other of the fixed cover portion and the rotatable cover portion has a catching portion, the engaging portion and the catching portion being configured such that, when the rotatable cover portion is moved to an open position, the engaging portion and the catching portion are engaged with each other to hold the rotatable cover portion at the open position, wherein the engaging portion has a locking tab formed so as to be perpendicular to an axial direction of the hinge portion, the locking tab is configured to deflect in the axial direction of the hinge portion during the engagement between the engaging portion and the catching portion, and the locking tab has a locking protrusion protruding outwardly from an outside face of the locking tab or inwardly from an inside face of the locking tab, wherein the catching portion has a locking frame configured to be engaged with the locking protrusion of the locking tab through the deflection of the locking tab, and the locking frame has a locking edge configured to be engaged with the locking protrusion, the locking edge being provided inwardly or outwardly on a side on which the locking protrusion of the locking tab is provided, and wherein the locking protrusion has a front side face configured as an upward sloping face that makes slide contact with the locking edge to gradually deflect the locking tab when the rotatable cover portion is first moved toward the open position, a rear side face configured as a downward sloping face that makes slide contact with the locking edge after the locking tab slides over the upward sloping face through the deflection of the locking tab and allows the locking tab to gradually return from the deflected state to generate an engagement force between the locking tab and the locking edge, the downward sloping face being steeper than the upward sloping face, and an intermediate section extending from the upward sloping face to the downward sloping face and having a curved or flat surface, the intermediate section located inside an outer peripheral face of the locking protrusion, wherein the downward sloping face is formed to have an arch shape.

8. The electronic component protecting cover according to claim 7, wherein the downward sloping face coincides with a portion of the outer peripheral face of the locking protrusion.

9. The electronic component protecting cover according to claim 7, wherein the surface of the intermediate section is configured as a flat cut face.

10. The electronic component protecting cover according to claim 7, wherein the engaging portion is formed at two locations along the axial direction of the hinge portion, and the catching portion is formed at two locations along the axial direction of the hinge portion, wherein each engaging portion has a pair of rib-shaped locking tabs disposed so as to be separated from each other in the axial direction of the hinge portion and parallel to each other, and the locking tabs have locking protrusions protruding outwardly from outside faces of the locking tabs or inwardly from inside faces of the locking tabs bilaterally symmetrically with respect to a center line between the locking tabs, wherein each of the catching portions has a pair of locking frames disposed so as to be separated from each other in the axial direction of the hinge portion and parallel to each other, and the locking frames have locking edges configured to be engaged with the locking protrusions, the locking edges being formed inwardly or outwardly on sides on which the locking protrusions of the corresponding locking tabs are provided, and wherein a distance between the pair of locking tabs is smaller than a distance between one of the locking tabs of one of the engaging portions located on a side of the other of the engaging portions and one of the locking tabs of the other of the engaging portions located on a side of the one of the engaging portions.

11. The electronic component protecting cover according to claim 10, wherein the locking protrusions are outwardly protruded from the outside faces of the locking tabs bilaterally symmetrically with respect to the center line between the locking tabs, and wherein at two points on the pair of locking tabs where the pair of locking tabs becomes closest to each other during the deflection, a distance between the pair of locking tabs in a state in which the pair of locking tabs are deflected is larger than a sum of protrusion heights of the locking protrusions of the locking tabs.

12. The electronic component protecting cover according to claim 11, wherein the locking edges of the locking frames configured to be engaged with the locking protrusions are formed inwardly on the sides on which the locking protrusions of the corresponding locking tabs are provided, and the locking frames have recesses opposed to each other in the axial direction of the hinge portion such that each of the locking frames has a bottomed cylindrical shape, and the locking edges are configured as edges of peripheral walls of the recesses.

13. The electronic component protecting cover according to claim 11, wherein each of the locking frames is configured as a locking hole, and the hole edge sections of the locking hole provided on the sides on which the locking protrusions of the corresponding locking tabs are provided are configured as the locking edges.

14. The electronic component protecting cover according to claim 10, wherein during the engagement of the engaging portions and the catching portions, for each pair of rib-shaped locking tabs, a clearance is defined directly by and between respective distal ends of each of the locking tabs of the pair of rib-shaped locking tabs.

15. The electronic component protecting cover according to claim 7, wherein the engaging portions and the catching portions are disposed on outer sides of respective ends of the hinge portion in the axial direction.

* * * * *